United States Patent [19]
Arai et al.

[11] Patent Number: 5,721,620
[45] Date of Patent: Feb. 24, 1998

[54] FACSIMILE APPARATUS WITH CONTROL OF INK JET PRINTER RECOVERY PROCESSING

[75] Inventors: Koji Arai, Kawasaki; Kiyoharu Yoshioka, Yokohama, both of Japan

[73] Assignee: Canon Kabushiki Kaisha, Tokyo, Japan

[21] Appl. No.: 643,530

[22] Filed: May 6, 1996

Related U.S. Application Data

[63] Continuation of Ser. No. 529,911, Sep. 18, 1995, abandoned, which is a continuation of Ser. No. 427,708, Apr. 24, 1995, abandoned, which is a continuation of Ser. No. 670,550, Mar. 15, 1991, abandoned.

[30] Foreign Application Priority Data

| Mar. 16, 1990 | [JP] | Japan | 2-66116 |
| Mar. 16, 1990 | [JP] | Japan | 2-66117 |
| Mar. 16, 1990 | [JP] | Japan | 2-66118 |

[51] Int. Cl.⁶ .................. H04N 1/00; H04N 1/32; H04N 1/034; B41J 2/165
[52] U.S. Cl. .................. 358/296; 358/439; 358/502; 347/3; 347/23
[58] Field of Search .................. 358/296, 434–439, 358/444, 468, 502; 347/3, 23; 395/115, 116

[56] References Cited

U.S. PATENT DOCUMENTS

| 4,313,124 | 1/1982 | Hara . | |
| 4,323,905 | 4/1982 | Reitberger et al. | 346/75 |
| 4,345,262 | 8/1982 | Shirato et al. . | |
| 4,459,600 | 7/1984 | Sato et al. . | |
| 4,463,359 | 7/1984 | Ayata et al. . | |
| 4,491,853 | 1/1985 | Hayashi et al. | 346/76 PH |
| 4,558,332 | 12/1985 | Takahashi | 346/140 R |
| 4,558,333 | 12/1985 | Sugitani et al. . | |
| 4,595,948 | 6/1986 | Itoh et al. | 358/75 |
| 4,661,822 | 4/1987 | Hirota et al. . | |
| 4,704,636 | 11/1987 | Yano | 358/280 |
| 4,723,129 | 2/1988 | Endo et al. . | |
| 4,734,718 | 3/1988 | Iwagami et al. | 346/140 R |
| 4,740,796 | 4/1988 | Endo et al. . | |
| 4,796,091 | 1/1989 | Nohtomi | 358/256 |
| 4,845,549 | 7/1989 | Someya . | |
| 4,967,204 | 10/1990 | Terasawa et al. | 346/140 R X |
| 4,970,599 | 11/1990 | Nobuta | 358/296 |
| 5,132,710 | 7/1992 | Ejiri et al. | 346/140 R |
| 5,132,711 | 7/1992 | Shinada et al. | 346/140 R |
| 5,175,566 | 12/1992 | Ejiri et al. | 346/140 R |
| 5,220,342 | 6/1993 | Moriyama | 346/140 R X |
| 5,229,792 | 7/1993 | Ono et al. | 358/438 X |
| 5,251,040 | 10/1993 | Saito | 358/434 X |
| 5,262,872 | 11/1993 | Yoshimura et al. | 358/296 |

FOREIGN PATENT DOCUMENTS

| 0287098 | 10/1988 | European Pat. Off. . |
| 0363146 | 4/1990 | European Pat. Off. . |
| 59-123670 | 7/1984 | Japan . |
| 59-138461 | 8/1984 | Japan . |
| 61-029269 | 2/1986 | Japan . |
| 63-053632 | 3/1988 | Japan . |
| 63-056472 | 3/1988 | Japan . |
| 63-130371 | 6/1988 | Japan . |
| 1130948 | 5/1989 | Japan . |
| 1195049 | 8/1989 | Japan . |
| 1290431 | 11/1989 | Japan . |
| 90000974 | 2/1990 | WIPO . |

*Primary Examiner*—Eric Frahm
*Attorney, Agent, or Firm*—Fitzpatrick, Cella, Harper & Scinto

[57] ABSTRACT

A facsimile apparatus performs head recovery processing for recovering the state of ink discharge of a plurality of ink heads for different colors. Mode determining circuitry determines a receiving mode and control circuitry controls the head recovery processing according to a receiving mode determined by the mode determining circuitry.

69 Claims, 22 Drawing Sheets

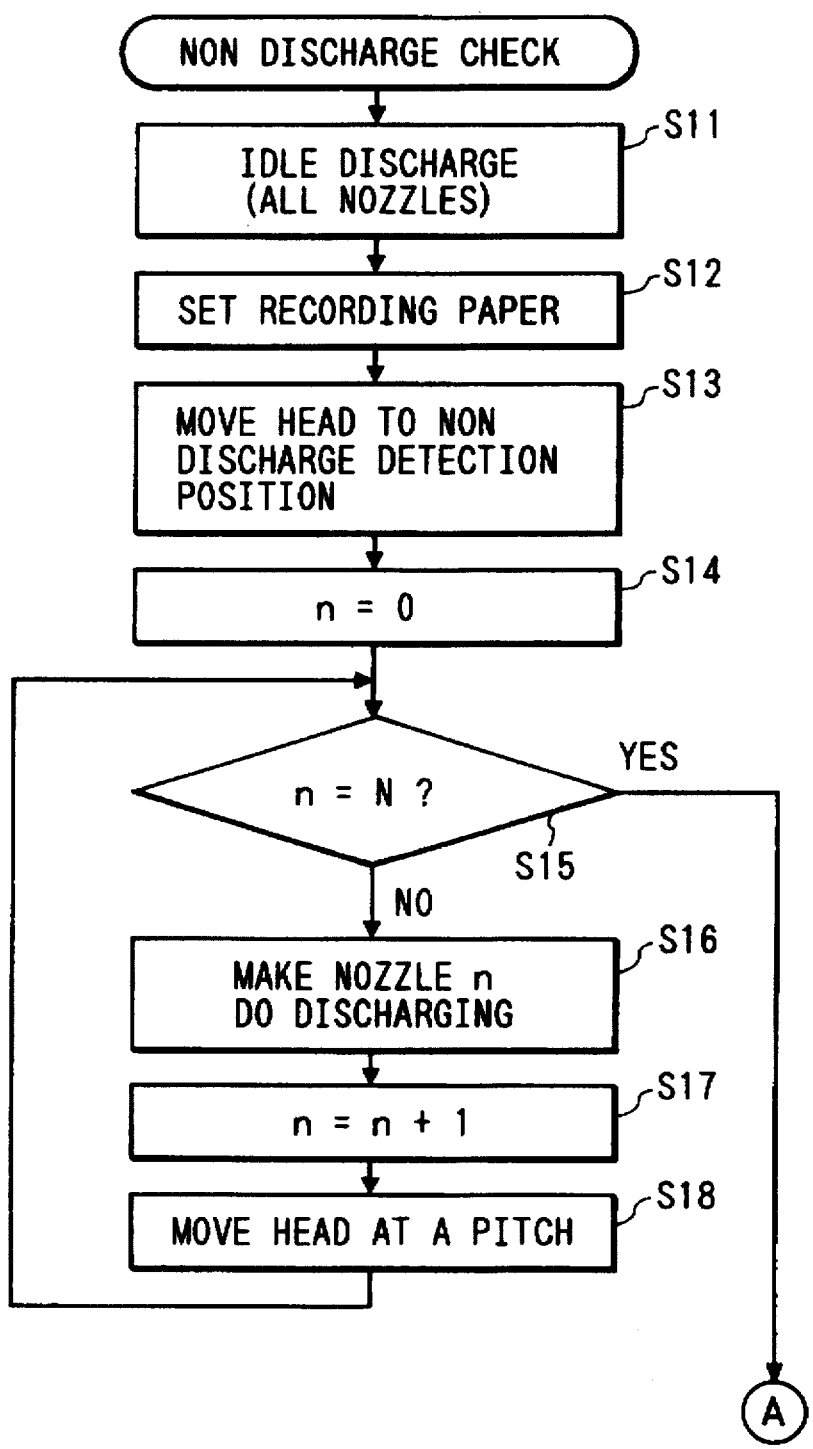

| FIG. 12A | FIG. 12B |

FACSIMILE APPARATUS WITH CONTROL OF INK JET PRINTER RECOVERY PROCESSING

This application is a continuation of application Ser. No. 08/529,911 filed Sep. 18, 1995, now abandoned which is a continuation of application Ser. No. 08/427,708 filed Apr. 24, 1995, now abandoned which is a continuation of application Ser. No. 07/670,550 filed Mar. 15, 1991 now abandoned.

BACKGROUND OF THE INVENTION

1. Field of the Invention

This invention relates to a color facsimile apparatus provided with an ink jet recording apparatus.

2. Related Background Art

Recently, an ink jet printer of a bubble jet type has been proposed, which utilizes bubbles generated by thermal energy for discharging ink from nozzles toward a printing medium to print characters, images, etc. on the printing medium. In this printer, a heat-generating resistor (i.e., a heater) provided in each orifice is far smaller in size than the piezoelectric element used in the conventional ink jet printer. Thus, it permits high density multiplex arrangement of orifices to obtain a high quality print image, as well as permitting high speed and low noise operation.

Meanwhile, the facsimile apparatus is required to be capable of not merely transmitting images at high speed but also receiving higher quality image at high speed. The bubble jet type ink jet printer as noted above is thought to be one of the printers which can meet the above requirements.

Meanwhile, in such ink jet printers ink nozzles of the recording head are liable to be clogged due to ink with its viscosity increased by non-use of the head, low relative humidity environment or difference in frequency or attachment of dust. Accordingly, a discharge recovery mechanism is provided for removing the increased viscosity ink by pumping out the increased viscosity ink from the inside of the recording head nozzles or withdrawing the ink through a cap for covering and protecting the nozzles.

Further, for full color printing, the ink jet printer is provided with recording heads for respective colors, for instance three colors Y, M and C or four colors Y, M, C and Bk.

For realizing a color facsimile apparatus capable of color image signal reception with such a color ink jet printer, it is important to permit control of a color ink jet head recovery operation efficiently and without wasteful recovery operation. Further, in various recovery operations noted above the recording head nozzles are covered by a cap when the head is out of use to prevent non-discharge of ink.

Even with such measures, however, clogging is liable in such cases as when the recording head is out of use for long time or when the room is comparatively dry, because the ink path of the ink nozzle is very fine. Further, when a nozzle used at a very low frequency is produced in a recording operation, clogging is liable in the next recording operation.

Therefore, when such a printer is used for a facsimile apparatus, a white streaky or fringe-like pattern may be generated in the output image in spite of normal completion of communication, thus leading to deterioration of image quality or missing of information.

SUMMARY OF THE INVENTION

An object of the invention is to provide a facsimile apparatus, which can solve the above problems individually or collectively.

Another object of the invention is to provide a facsimile apparatus which can provide for a highly reliable facsimile apparatus.

A further object of the invention is to provide a facsimile apparatus, which permits efficient recovery operation.

A still further object of the present invention is to provide a facsimile apparatus in which a detection result corresponding to a condition after the printing operation can be provided.

A preferred embodiment of the invention to attain the above objects is a facsimile apparatus, which comprises head recovery processing means for recovering the ink discharge state of a plurality of ink jet heads for different colors, mode determining means for determining a receiving mode and control means for controlling the head recovery processing means according to a receiving mode determined by said determining means.

A further object of the invention is to provide a facsimile apparatus, which is highly reliable and consumes less coloring material.

A yet further object of the invention is to provide a facsimile apparatus having a novel function.

A yet another object of the invention is to provide a novel ink jet recording apparatus.

The above and other objects and features of the invention will become apparent from the following description of embodiments and drawings.

BRIEF DESCRIPTION OF THE DRAWINGS

FIGS. 7A and 7B are flow charts illustrating a non-discharge check control operation procedure in an embodiment of the invention;

DETAILED DESCRIPTION OF THE PREFERRED EMBODIMENTS

Construction of recording system (or printer)

Figure 2:
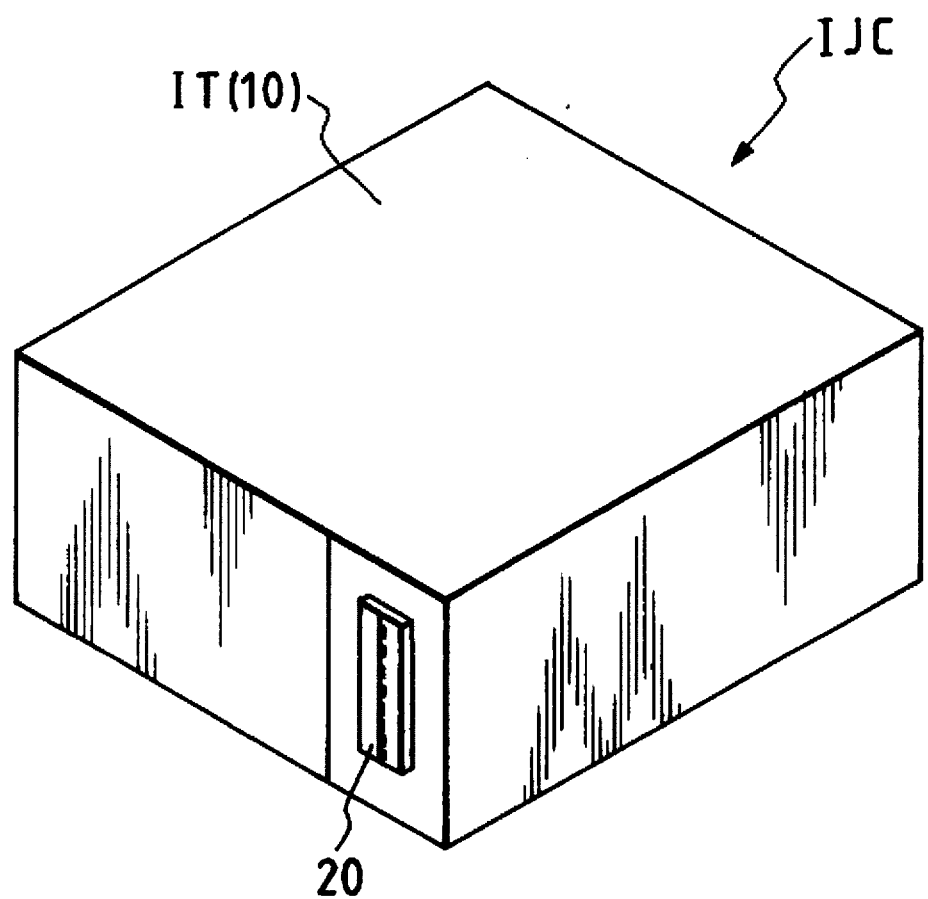
FIG. 2 is a perspective view showing an example of a bubble jet type ink jet cartridge, to which the invention is applicable.
Figure 3:
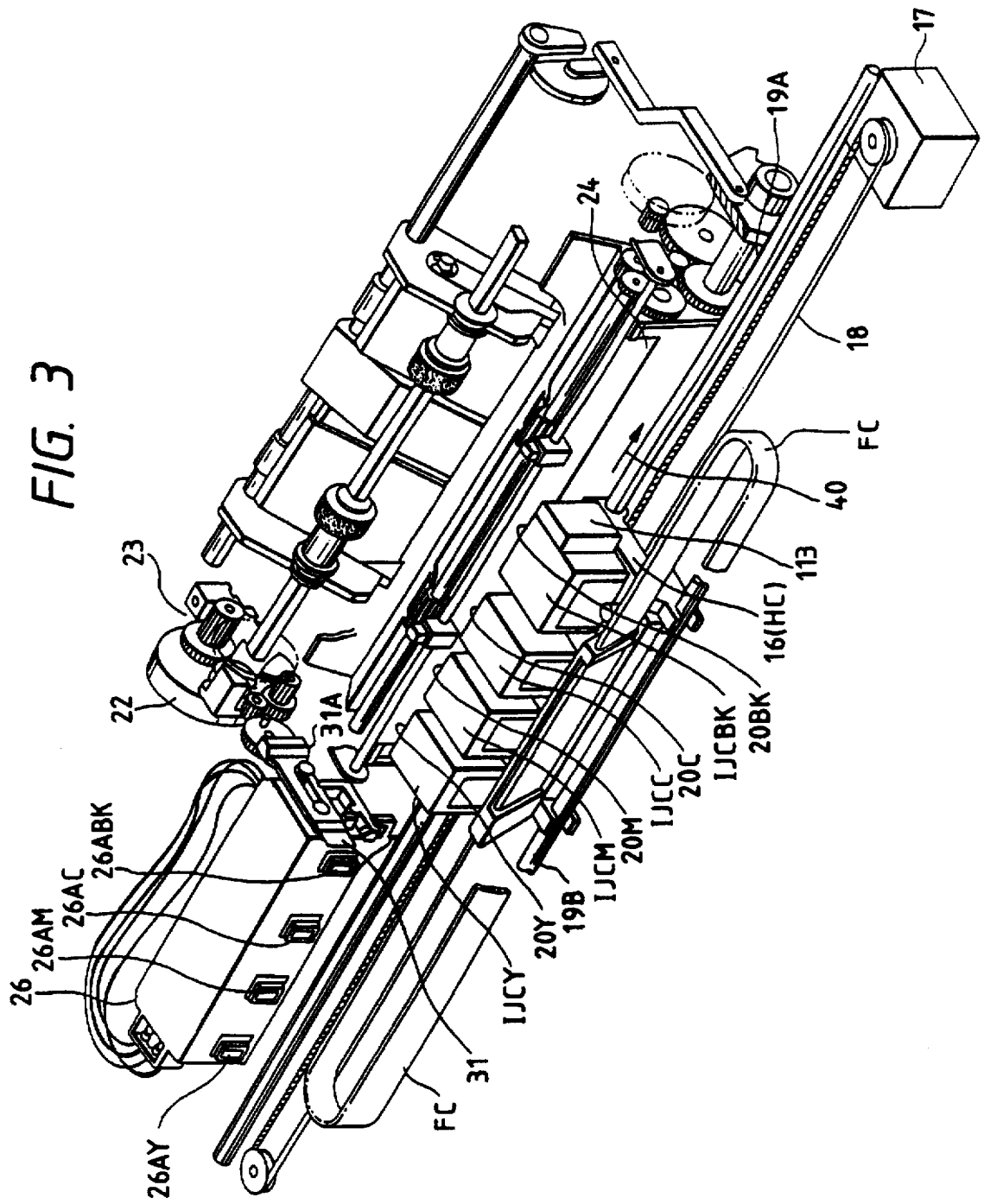
FIG. 3 is a perspective view showing the construction of a recording system of a facsimile apparatus, to which the invention is applicable.

FIGS. 2 and 3 show an example of an ink jet printer suitable as a recording system of a facsimile apparatus according to the invention. Referring to the Figures, designated at 20 is an ink jet head (or recording head) of bubble jet system, and at IJC is an ink jet cartridge integral with ink jet head 20 and provided with ink tank IT for supplying ink to the head.

Ink jet cartridge IJC in this embodiment is such that ink jet head 20 has an end slightly projecting from the front surface of ink tank IT, as seen from the perspective view of FIG. 2. Ink jet head cartridge IJC is secured to and supported by a carriage which is mounted in ink jet recording apparatus IJRA as will be described later. It is of disposable type and can be mounted on and dismounted from the carriage.

First ink tank IT (10) stores ink supplied to ink jet head IJH. It includes an ink absorbing member, a vessel accommodating the ink absorbing member and a lid member sealing the vessel (these components all being not shown). Ink filling ink tank IT (10) is progressively supplied to the ink jet head side according to ink discharge. The ink jet head is provided with a residual ink amount check mechanism for checking the residual amount of ink, and the residual amount of ink can be detected from CPU 101 of the apparatus.

Ink jet cartridge IJC having the above construction is detachably mounted in a predetermined way in carriage HC of ink jet recording apparatus IJRA, and relative movement of the carriage HC and recording medium is controlled according to a predetermined recording signal for forming a desired record image.

Individual color cartridges IJCBk (black), IJCC (cyan), IJCM (magenta) and IJCY (yellow) have the same construction. Cartridge IJCBk has an ink tank of a slightly increased size from considerations of high frequency of use in monochromatic image reception.

FIG. 3 is a perspective view showing ink jet recording apparatus IJRA provided with a mechanism for the above processing.

Referring to the Figure, designated at 20Bk, 20C, 20M and 20Y are individual color ink jet heads (or recording heads) of ink jet head cartridge IJC provided with nozzles for discharging ink against the recording surface of recording paper fed over platen 24. Designated at 16 is a head carriage HC holding recording head 20. The head carriage is coupled to a portion of drive belt 18 for transmitting drive force of drive motor 17 and is slidable along two parallel guide shafts 19A and 19B for reciprocal movement over the entire width of recording paper in recording head 20.

Figure 1:
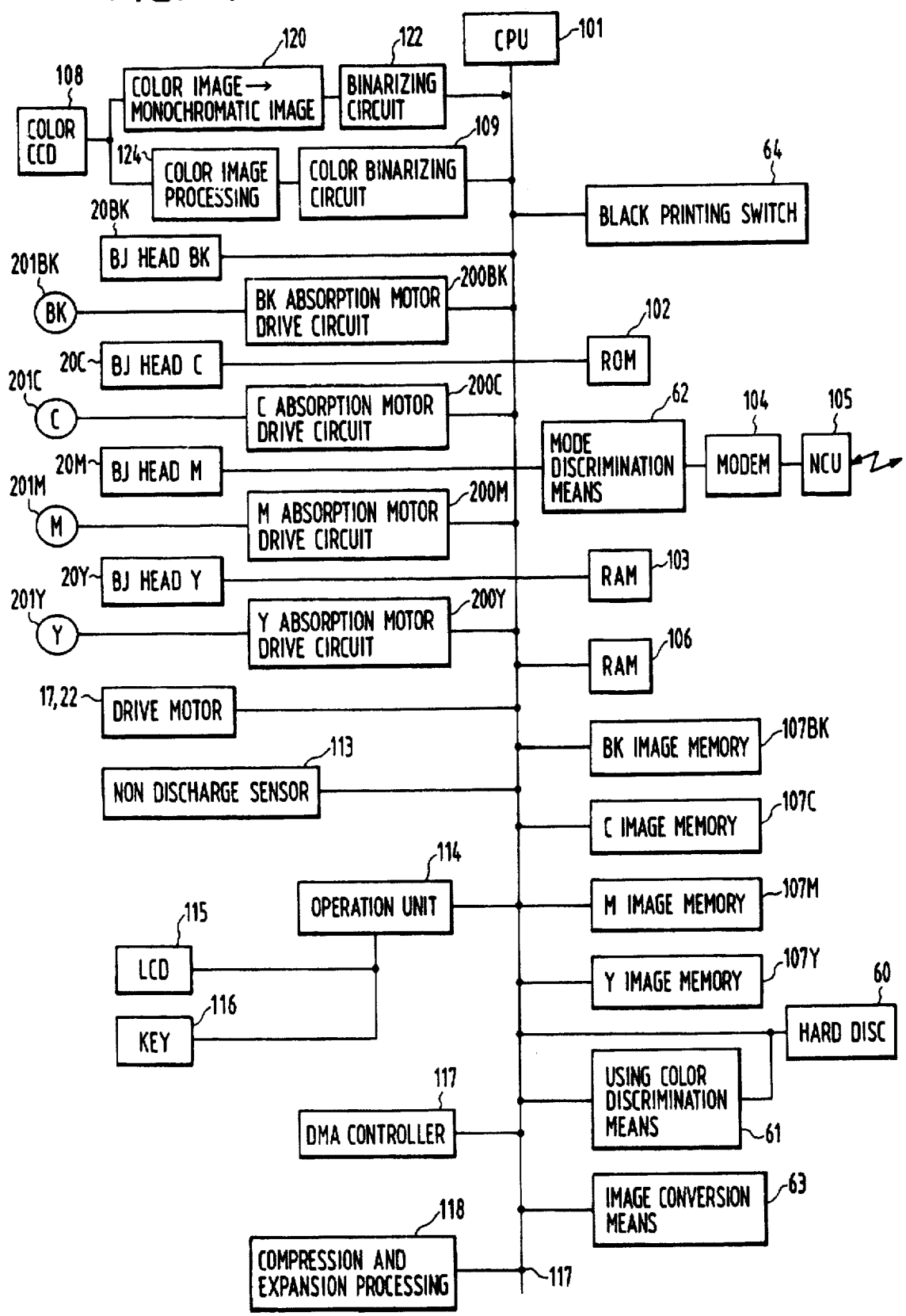
FIG. 1 is a block diagram showing the basic construction of an embodiment of the invention.

Designated at 22 in FIG. 1 is a control circuit for controlling the driving of drive motor 17. The circuit controls the displacement of head carriage HC according to a command from CPU 101. In recording, head carriage HC is moved in the direction of arrow 40 in the order of ink jet cartridges disposed in head carriage HC, i.e., in the order of black, cyan, magenta and yellow. The individual color cartridges are spaced apart from one another in the direction of movement, thus providing different timings of recording corresponding to the spacing. For recording over the entire paper width, the carriage is located at a position corresponding to the leading end of paper at the start of line recording and is located at a position corresponding to the trailing end of paper at the end of line recording. This means that the distance provided for being covered by the carriage is in excess of the distance in the monochromatic case by the spacing between ink jet heads 20Bk and 20Y.

Designated at 26 is a head recovery unit disposed at one end of the path of movement of recording head 20, for instance at a position facing a home position. Head recovery unit 26 is operated by drive force of motor 22 transmitted through transmitting mechanism 23, thus effecting capping of recording head 20. In an interlocked relation to the capping of recording head 20 by cap unit 26A of head recovery unit 26, a discharge recovery process is performed to remove ink of increased viscosity through forced discharge of ink from orifices. This is done by absorbing ink suitable absorbing means (for instance an absorbing pump) provided in head recovery unit 26 or pumping of ink through suitable pumping means provided in the ink supply path leading to recording head 20. Further, when recording is ended, the recording head is capped for protection.

Cap unit 26A has caps 26ABk, 26AC, 26AM and 26AY for respective colors. These caps are disposed in correspondence to the distances of the respective heads provided on the carriage, and with the carriage at home position thereof, the individual heads are found at positions facing the respective caps.

Figure 5:
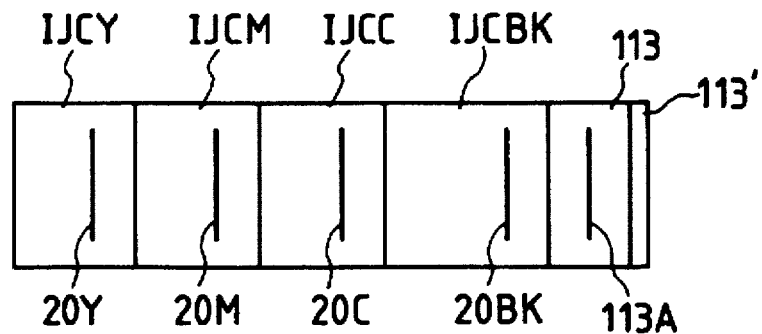
FIG. 5 is a plan view showing an example of a non-discharge sensor.

Designated at 113 is a non-discharge sensor including photoelectric conversion element array 113A such as a photosensor array for checking for attached ink having been discharged from head 20 for each dot. As shown in FIG. 5, array 113A extends parallel to and has a length equal to or slightly greater than the length of the nozzle group of head 20. Non-discharge sensor 113 is mounted on carriage 16 (see FIG. 3) at a position near head 20, and it is retreated with respect to the orifices of head 20 lest photoelectric conversion element array 113A should touch blade (or wiper) 31. It includes white illumination light source 113' and can detect the state of ink of individual colors recorded on recording paper from reflected light.

Designated at 31 is a blade provided on a side surface of head recovery unit 26. The blade is made of silicone rubber and serves as a wiping member. Blade 31 is supported in a cantilever fashion by blade support 31A. Like head recovery unit 26, it is operable by motor 22 and transmission mechanism 23 for engagement with the discharge surface of recording head 20. At an adequate timing in the recording operation of recording head 20 or after discharge recovery operation of head recovery unit 26, blade 31 is projected into the path of movement of recording head 20, thus effecting wiping of dew, leaked ink or dust away from the discharge surface of head 20.

Construction of control system

Figure 11:
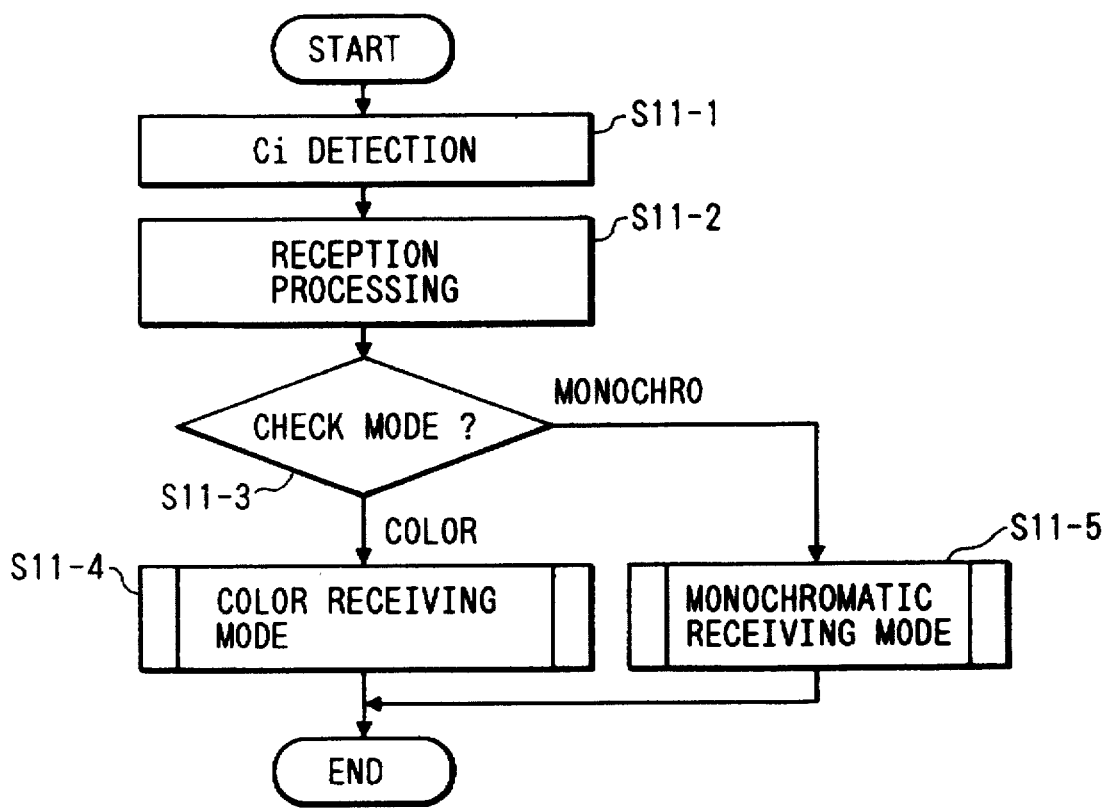
FIG. 11 is a flow chart illustrating a main routine of control according to the invention.

FIG. 1 shows the circuit construction of a facsimile system as embodiment of the invention. Referring to the Figure, designated at 101 is a main CPU (central processing unit) consisting of a microcomputer or the like for effecting control of the whole apparatus for transmission and reception of data through bus 117. Designated at 102 is a ROM (read-only memory) for storing contents of various control procedures (or programs) of CPU 101 as shown in FIG. 11. Designated at 101 is a work RAM (random access memory) used by CPU 101 for counters, registers, etc. Designated at 104 is a modulation/demodulation unit (MODEM) for data transmission. Designated at 105 is a network control unit (NCU) connecting MODEM 104 to a public telephone line. Designated at 106 is a RAM for registration of such data as telephone numbers and abbreviations. Designated at 107 is an image RAM (DRAM) for tentatively storing image data at the time of recording image RAM 107 has sections 107Bk, 107C, 107M and 107Y for the respective colors. Designated at 60 is a hard disk, on which received image data is once preserved. The hard disk is not limitative as medium for data preservation, and it is possible to use other media such as semiconductor memories or tapes as well.

Designated at 61 is color-for-use determining means for determining color for use by monitoring a data block (i.e., 8-line image data) to be recorded next among image data preserved in hard disk 60.

Recording operation is performed while executing idle discharge as recovery process at a fixed interval for preventing clogging. Assuming the longitudinal dimension of the ink jet nozzle shown in FIG. 2 to correspond to one line, the idle discharge noted above is executed for every eight lines. Eight lines are dealt with as one block, and image data of the next block is monitored for each color. More specifically, image data is expressed as binary data of "1", representing the provision of ink, and "0", representing the provision of no ink. If "1" is present in the monitored block, judgement data of "1" is provided. In this way, 4-bit data with individual bits assigned to black, cyan, magenta and yellow in the mentioned order is produced and supplied to CPU 101. The idle discharge is executed according to this 4-bit data. While the idle discharge is executed for every eight lines in this embodiment, this is by no means limitative.

Figure 4:
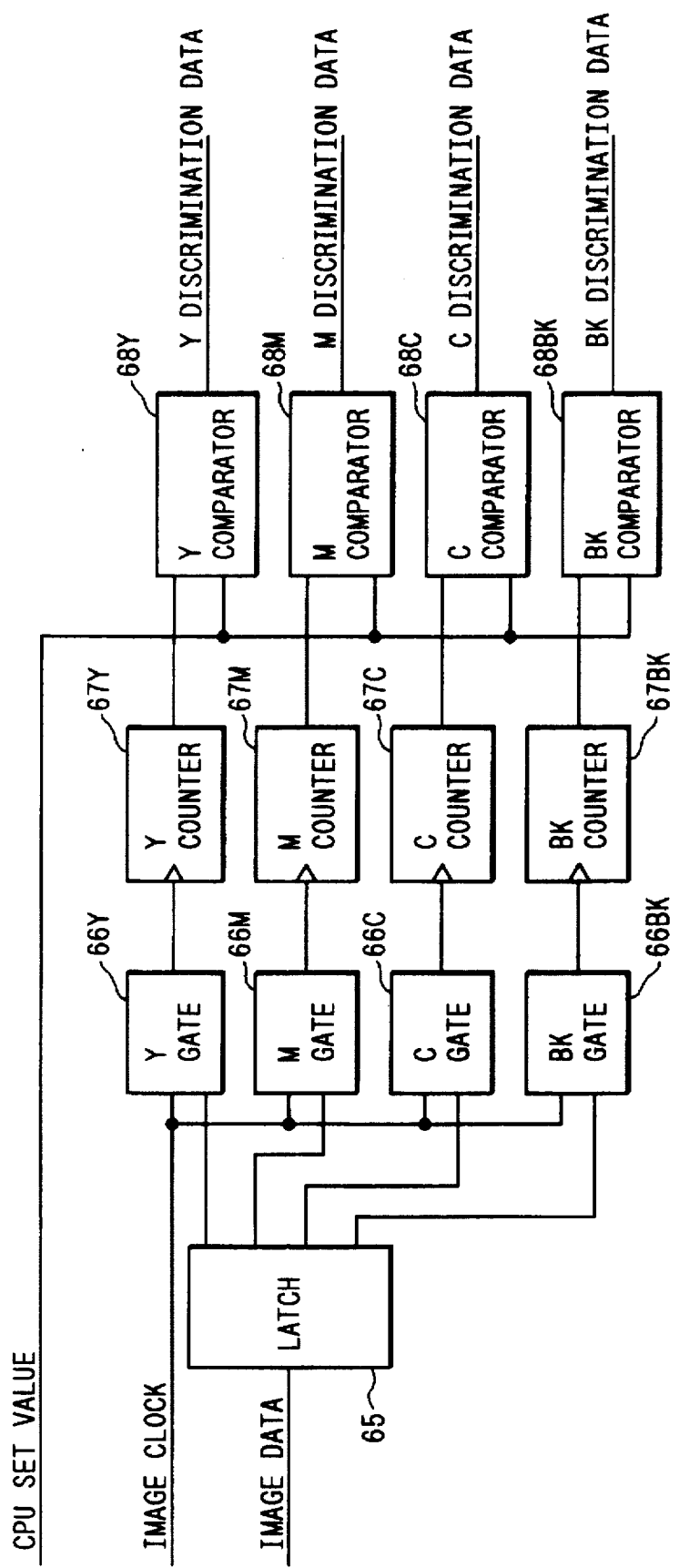
FIG. 4 is a block diagram showing a circuit construction of color-in-use determining means in an embodiment of the invention.

FIG. 4 shows a specific construction of the color-for-use determining means. Binary image data read out from hard disk 60 is supplied to latch 65 for separating component data Y, M, C and Bk. These data on-off control respective gates 66Y, 66M, 66C and 66Bk to control image clock output. That is, if binary image data supplied to gates 66Y, 66M, 66C and 66Bk are "1" (i.e., provision of ink), these gates provide image clock. Counters 67Y, 67M, 66C and 66Bk count the respective gate outputs, i.e., count pixels where the binary image data is "1" (provision of ink). The count is compared to a preset value in the CPU. If the count is the preset value or more, a judgement for color-for-use is given, while if the count is less than the preset value, a judgement for color-not-for-use is given. The preset value in the CPU is 10, for instance.

The above construction of the color-for-use determining means is by no means limitative. For example, where received data is not given as data R, G and B or as data Y, M, C and Bk but is given as separate density and color hue data such as data $L^*$, $a^*$ and $b^*$, determination of these data may be executed prior to extension of data $a^*$ and $b^*$ in extension processing circuit 128.

Designated at 62 is a mode checking means for checking whether receiving mode is monochromatic or color. Designated at 63 is image converting means for converting color image data into monochromatic image data by extracting the extent of shade of the color image data. Designated at 64 is a monochromatic print switch, which is operated when it is desired to effect forced recording in black ink of data in color receiving mode.

Designated at 108 is a color CCD (charge-coupled device) serving as image sensor means of original reading system. Color CCD 108 converts original image focused through a focusing lens such as a rod lens into an electric signal. Designated at 109 is a binarizing circuit for binarizing given color image data for each color component. Designated at 114 is a console having a key board and so forth. An operating panel of the console has liquid crystal display (LCD) 115 and various keys 116. Designated at 117 is a DAM controller for controlling data transfer between hard disk 60 and individual image memories 107Bk, 107C, 107M and 107Y according to command from CPU 101.

Designated at 120 is a color-to-monochromatic image conversion circuit for converting color image signal read out by color CCD 108 into monochromatic image data. For example, when image data obtained from color CCD 108 consists of three color components R, G and B, circuit 120 converts this image data into data Y given as $Y=0.6G+0.3R+0.1B$ or extracts sole component G. Designated at 122 is a binarizing circuit for binarizing the output of conversion circuit 120 through a binarizing processing based on an error diffusion process, a dither process, an average density preservation process, etc. Designated at 124 is a color image processing circuit for performing such processing as color balance control, color masking and VCR on color image data output of color CCD 108 for conversion to four components Y, M, C and Bk. Designated at 128 is a compression/extension processing circuit for compressing and extending the output of color image processing circuit 124 or data stored in hard disk 60. For example, circuit 128 compresses or conversely extends binary image data, for instance, through such processing as run length coding, forecast coding or entropy coding. Designated at 200Bk, 200C, 200M and 200Y are drive circuits for driving absorbing pumps for recovery of the heads for Bk, C, M and Y. These drive circuits are provided for the individual ink colors. Designated at 201Bk, 201C, 201M and 201Y are motors for the absorbing pumps.

Operations of this embodiment of the apparatus will now be described.

Recovery processing

There are two different procedures of recovery processing for preventing the clogging with ink in the recording apparatus, i.e., "idle discharge" which is comparatively easily performed and "withdrawal discharge" which is performed for regular recovery.

Idle discharge

Forced discharge of ink without printing is effected from all the nozzles of recording head 20 shown in FIG. 3 toward cap unit 26A by moving head 20 to the position corresponding to cap unit 26A by driving drive motor 17 and applying like drive pulse to all heat generators in the nozzles of head 20. At this time, it is not necessary to cover (or cap) head 20 with cap unit 26A. The discharge is effected with cap unit 26A at a position spaced apart from head 20, and ink discharged into cap unit 26A is expelled into recovery unit 26.

Withdrawal discharge

Like the idle discharge as above, recording head 20 is brought to a position facing cap unit 26A, and then cap unit 26A is brought to cover head 20 with advancement of recovery unit 26 caused by driving motor 22. Then, ink in the nozzle is withdrawn by driving a withdrawal motor (not shown) in recovery unit 26. Even when clogging of the nozzle is not removed with idle discharge, the head can be recovered by having resort to withdrawing force of the withdrawal motor in recovery unit 26.

Printing of non-discharge detection pattern

Figure 6:
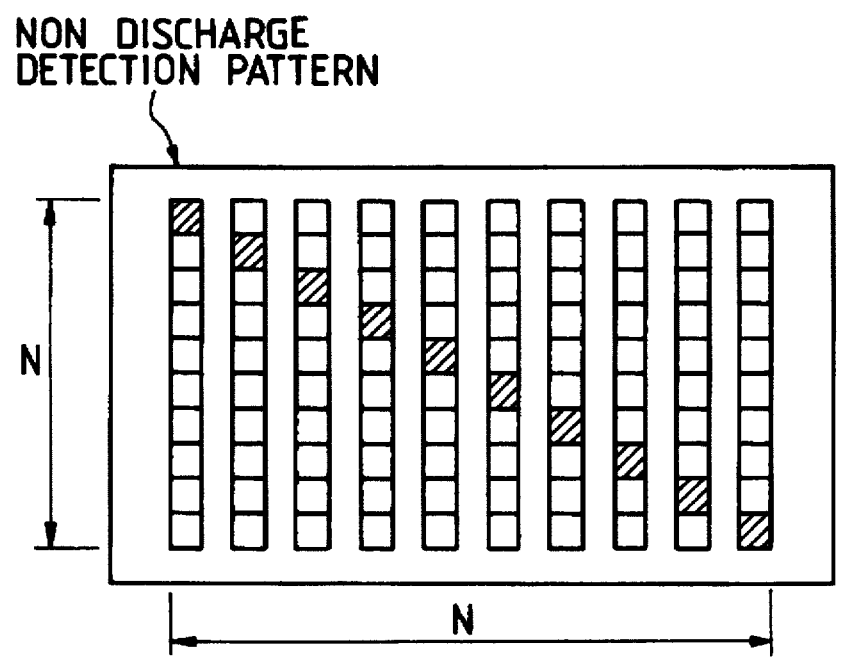
FIG. 6 is a view for explaining an example of non-discharge detection pattern printed at the time of non-discharge detection.

FIG. 6 shows an example of non-discharge detection pattern which is recorded at the time of non-discharge detection. In this pattern, shown shaded are ink positions obtained as a result of ink discharge executed sequentially for each of the nozzles of head 20 toward non-discharge sensor 120 from upper nozzles by moving carriage 16 along guides 19A and 19B to the right in the Figure. Labeled N is the number (integral number) of nozzles. The illustrated non-discharge detection pattern is by no means limitative. For example, a plurality of successive times of discharge may be executed from the same nozzle, or discharge may be executed once for each of a plurality of nozzle groups, into which all the nozzles are divided. In the latter case, non-discharge may be determined by checking whether the average density among the individual groups is uniform.

Further, in the present embodiment of the invention, the non-discharge detection pattern is directly recorded on recording paper. Alternatively, it is possible to provide a non-discharge detection portion, for instance exclusive paper, separately from recording paper and within the range of movement of the head carriage. In this case, the non-discharge check may be executed without contaminating the recording paper for recording image. In this embodiment, the recording paper is utilized for simplification of the apparatus. More specifically, roll paper is used, and a portion of paper used for non-discharge detection is subsequently cut away.

Example of control operation for non-discharge check

Figure 7B:
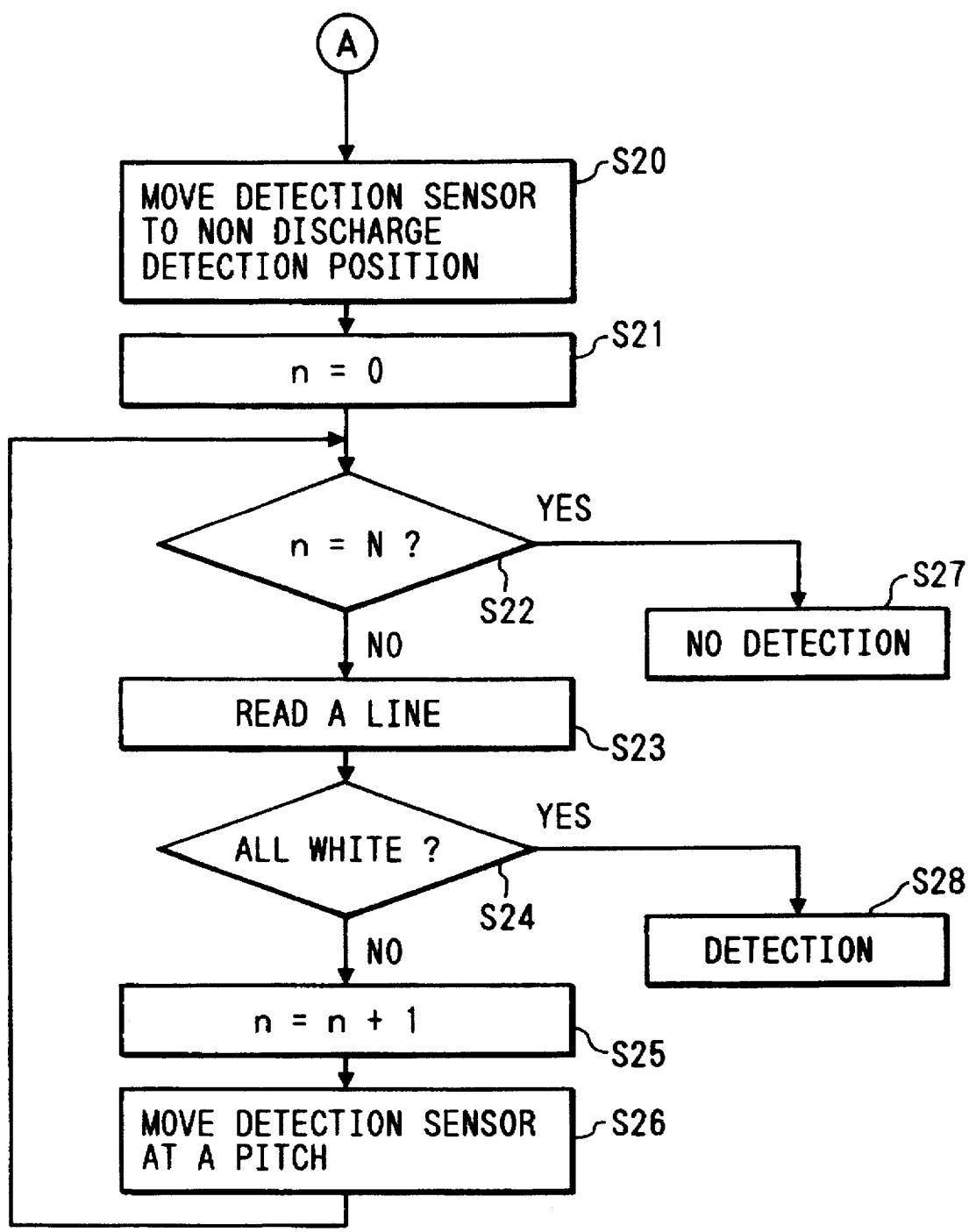

Now, a control operation for non-discharge check in the embodiment of the invention will be described with reference to the flow chart of FIGS. 7A and 7B. CPU 101 controls such that drive motor 17 is first driven to bring recording head 20 to the position of cap unit 26A for execution of idle discharge, i.e., forced discharge of ink without printing, about 10 times with drive pulse impression on all the nozzles of head 20 (step S11). Then, recording paper is set. More specifically, the roll paper is paid off to provide a new paper surface by driving the motor (step S12). Subsequently, head 20 is moved to a position of non-discharge pattern detection by agency of drive motor 17 and carriage 16 (Step S13). Then, count n of an internal counter is set to "0" (step S14).

Then, a check is done as to whether number N of the last one of the nozzles of head 20 is reached by count n. If the result of the check is "NO", discharge from n-th nozzle (from 0-th nozzle) is caused with drive pulse impression thereon (step S16). Then, count n of the internal counter is incremented by "1" (step S17), and then head 20 is moved by one pitch with driving of drive motor 17 (step S18). The routine then goes back to step S15 noted above, and the above operation sequence is repeated until n=N. Subsequently, head 20 is moved to a position of non-discharge detection by agency of drive motor 17 and carriage 16.

When ink is discharged from the last nozzle of head 20, a non-discharge detection pattern as shown in FIG. 6 is printed on the non-discharge detection surface of non-discharge detection unit 120. The pattern shown in FIG. 6 applies to a case when there is no non-discharge from any of the orifices. If it is found in step S15 that n=N, i.e., if the result of check is "YES", non-discharge detection sensor 113 is moved to the non-discharge detection position, i.e., position, at which the non-discharge detection pattern is printed, by moving the carriage (step S20). Then, count n of the internal counter is set to "0" (step S21).

Subsequently, whether the number N of the last one of the nozzles of head 20 is reached by count n of the internal counter is checked (step S22). If the number has not been reached yet, one line, i.e., n-th line, is read out through non-discharge detection sensor 113 (step S23). If the line is found to be entirely white, i.e., if no discharge of ink is detected (step S24), a message of detection of non-discharge is given to main CPU 101 (step S28). This notice may be effected by changing the value of a predetermined flag.

If it is determined in step S24 that the line is not entirely white, count n of the internal counter is incremented by "1" (step S25), and then non-discharge detection sensor 113 is moved by one pitch (step S26). The routine then goes back to step S22, and the above operation sequence is repeated.

The sequence of steps S22 through S26 is repeated until it is found in step S22 that the number N is reached by count n. This takes place when there is not non-discharge, that is, ink is discharged normally from all the nozzles. Thus, at this time a message of non-detection of non-discharge is given (step S27). This notice, like the above case, may be given by changing the value of a predetermined flag.

In the foregoing, the basic sequence of non-discharge check has been described. When this routine is executed for the individual colors, it is ready to perform recording in color recording mode.

In the embodiment shown in FIG. 1, non-discharge is informed to the CPU as soon as non-discharge is detected even in a single place, this is by no means limitative. For example, it is possible to determine the number of places of non-discharge.

Overall operation

Figures 12, 12A:
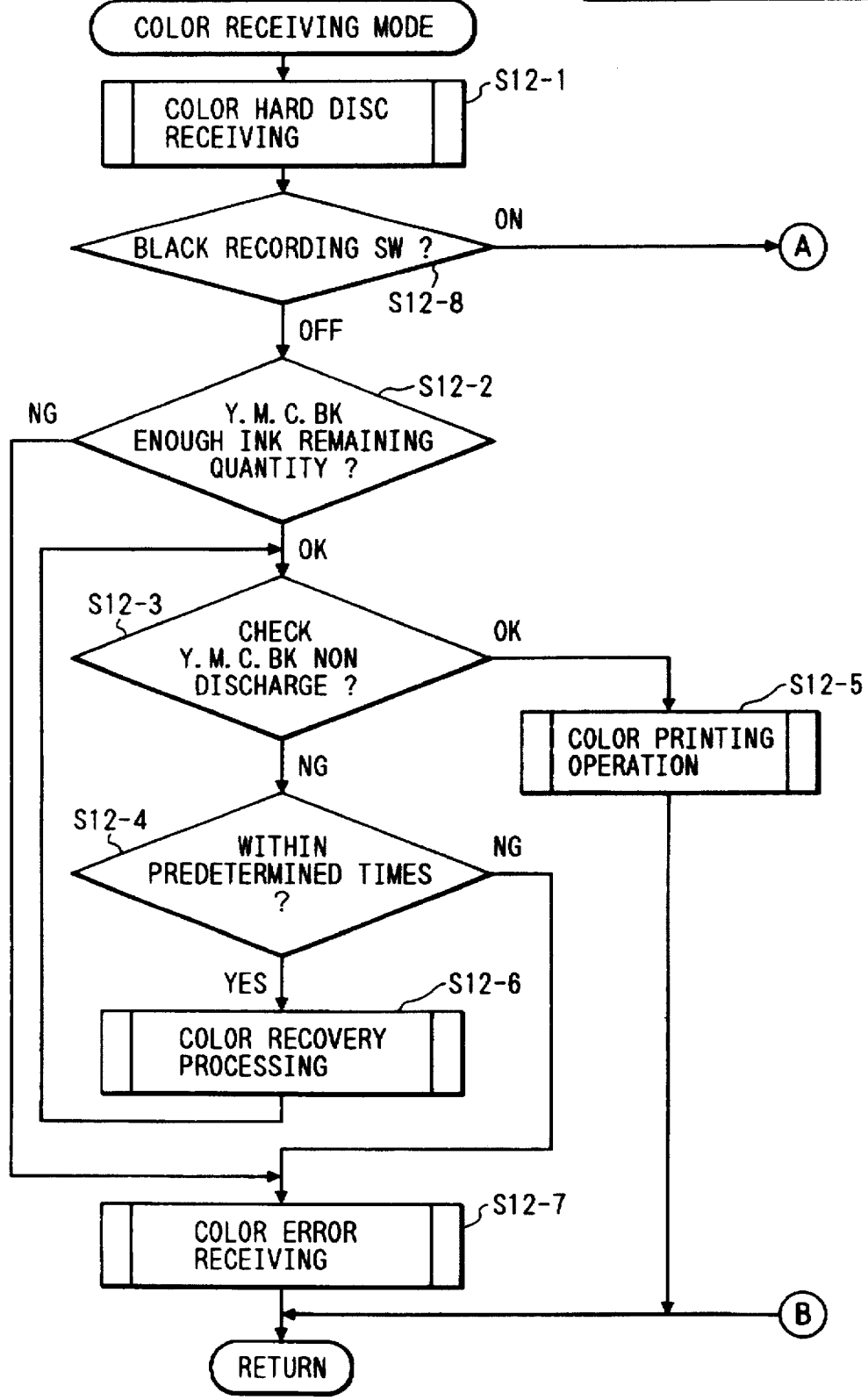
FIGS. 12A and 12B are flow charts for explaining a sub-routine color receiving mode shown in FIG. 11.
Figure 12B:
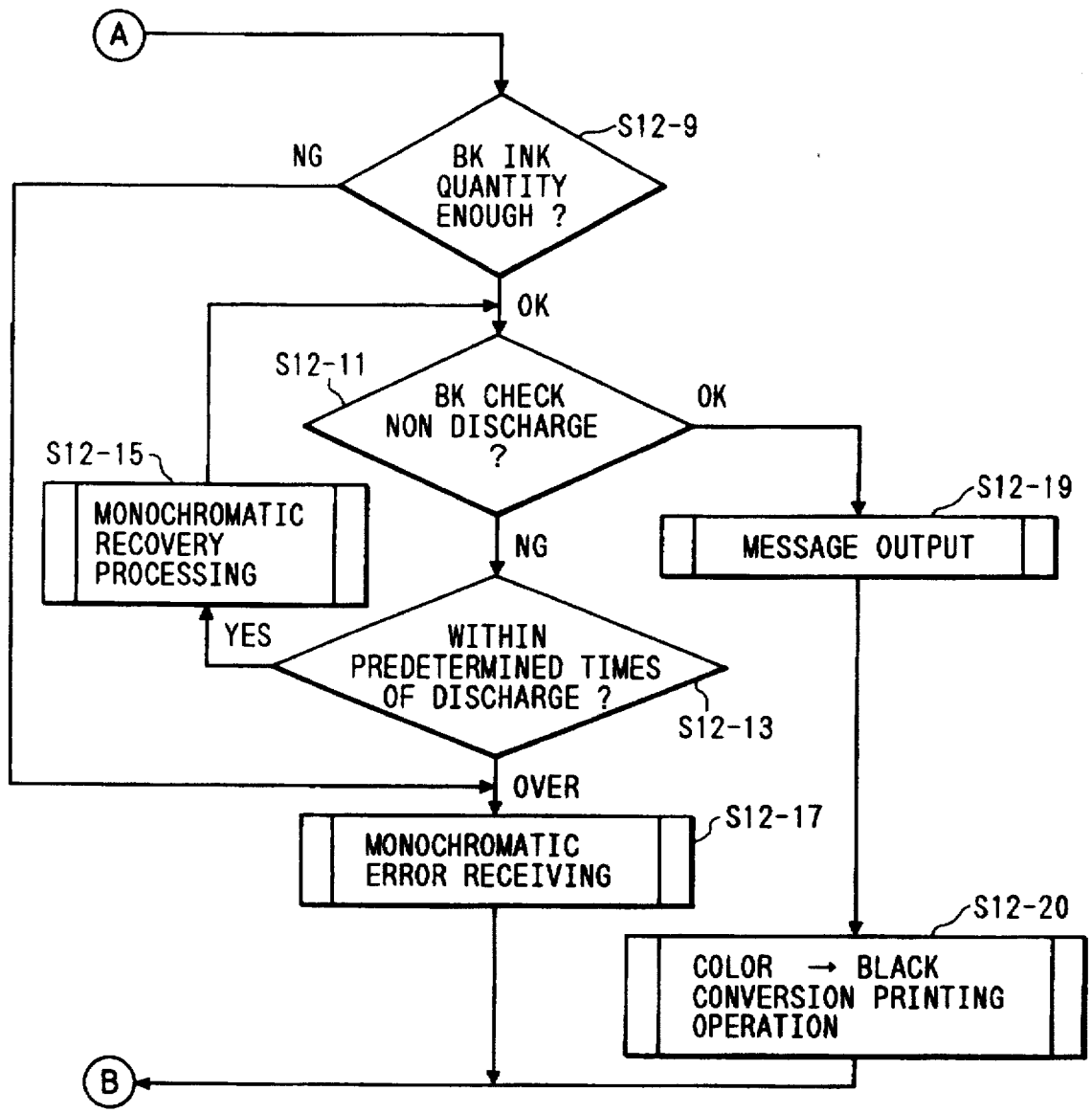

Now, a color receiving mode will be described with reference to FIGS. 12A and 12B and a monochromatic receiving mode will be described with reference to FIG. 13.

In the color receiving mode, color hard disk reception is performed, that is, received color image data is stored in the hard disk without complete extension in circuit 128 (step S12-1). That is, transmitted image data is preserved in hard disk 60. The image data which is preserved in the hard disk may not be completely extended but may be partly extended through development to intermediate code, for instance.

Subsequently, whether black printing switch 64 is "on" is checked (step S12-8). If the result on is "ON", a remaining black ink quantity check (step S12-9) and non-discharge check (step S12-11) are executed for black ink. If the result of the non-discharge check is "NO", a message of the "on" state of the black printing switch or start of black printing is given (step S12-19). Then, a color-to-monochromatic conversion printing operation as will be described later in detail is performed (step S12-20). If the non-discharge check in step S12-11 yields "NG", a monochromatic recovery process (S12-15) is executed, that is, idle discharge and/or withdrawal discharge of the black ink head is executed, and then step S12-11 to be described later is executed once again. If this check yields "NG", monochromatic error reception (step S12-17) as will be described later is performed. If it is found in step S12-8 that the switch is "off", the following process is executed.

First, the remaining ink quantity in IJC for each of colors Y, M, C and Bk is checked (step S12-2). If the ink quantity is enough for all the four colors, non-discharge check is executed for each of four colors Y, M, C and Bk (step S12-3). If ink is not enough for even a single color among the four colors, color error reception (step S12-7) as will be described later is performed. If it is found in the non-discharge check in step S12-3 that the remaining ink quantity is enough for all of four colors Y, M, C and Bk, a color printing operation is performed (step S12-5). If even a single head among the four heads for the respective colors has a non-discharge nozzle, the number of times of recovery process executed is checked (step S12-4). If the number is within a predetermined number, a color recovery process is executed (step S12-6). The routine then goes back to step S12-3 to repeat the above operation sequence. If there is a head having a non-discharge nozzle after exceeding of the predetermined number by the number of times of execution of the recovery process, color error reception is performed in step S12-7.

The color recovery process in step S12-6 noted above is to execute idle discharge and/or withdrawal discharge with respect to the four heads for respective colors Y, M, C and Bk.

Figure 13:
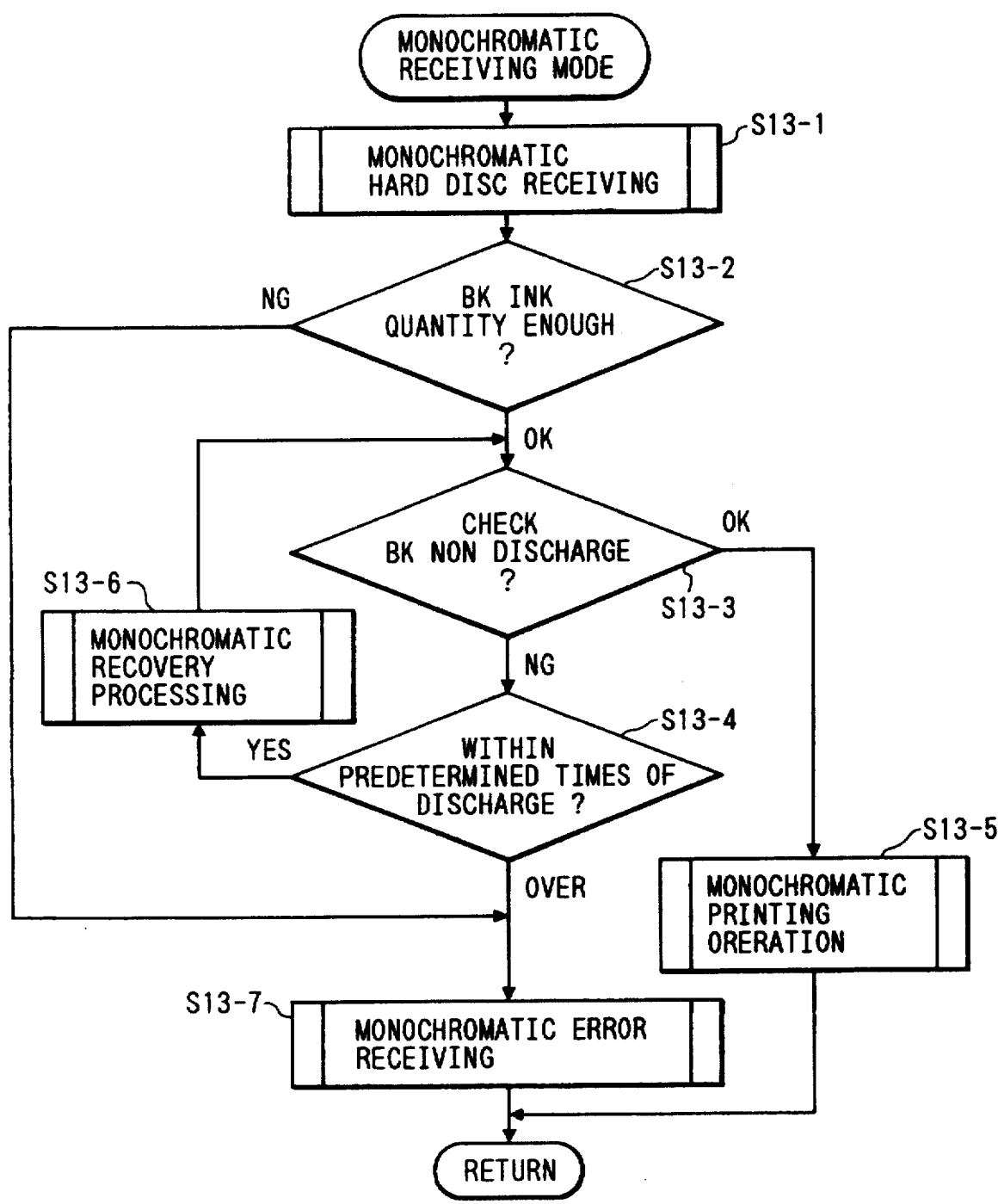
FIG. 13 is a flow chart for explaining a sub-routine color receiving mode shown in FIG. 11.

In the monochromatic receiving mode, as shown in FIG. 13 monochromatic hard disk reception (step S13-1) is performed to preserve transmitted image data in hard disk 60. Then, the remaining ink quantity in IJCBk is checked (step S13-2). If the result of check is "OK", non-discharge check for black ink is executed (step S13-2). If the result is "OK", non-discharge check (step S13-3) is executed for black ink. If ink is not enough, monochromatic error reception as will be described later is executed (step S13-7). If the result of the non-discharge check for black head in step S13-3 is "OK", monochromatic printing operation is performed (step S13-5). If there is a non-discharge nozzle, the number of times of recovery process execution is checked (step S13-4). If the number is within a predetermined number, monochromatic recovery process (step S13-6) is executed. The routine then goes back to step S13-3, and the above sequence is repeated. If there is a non-discharge nozzle after exceeding of the predetermined number by the number of times of recovery process execution, monochromatic error reception in step S13-7 is executed.

The monochromatic recovery process in step S13-6 is to execute idle discharge and withdrawal discharge for the black head.

Alternatively, both idle discharge and withdrawal discharge may be executed for the black head.

Figure 14:
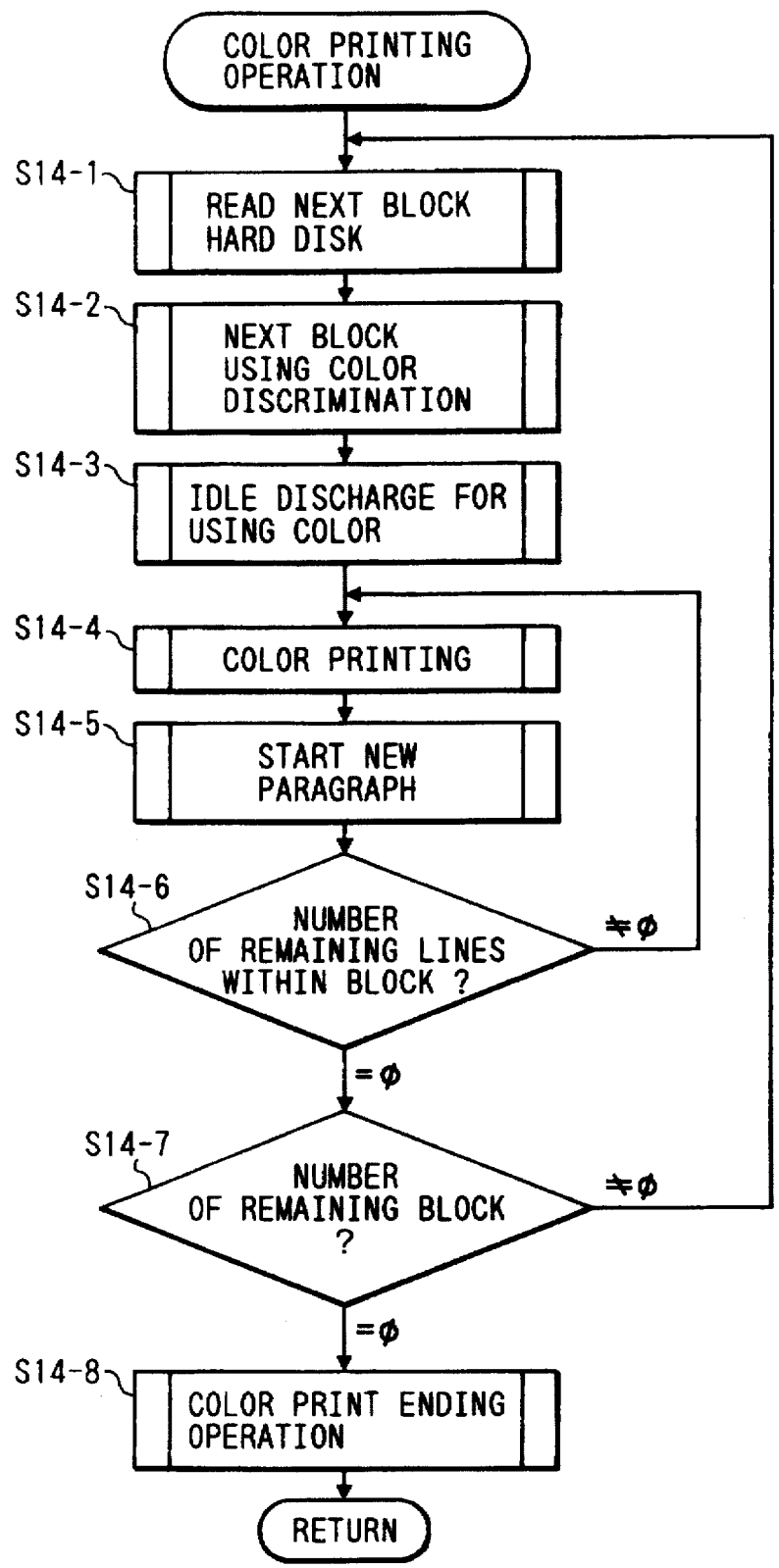
FIG. 14 is a flow chart for explaining a sub-routine color printing operation shown in FIGS. 12A and 12B.
Figure 15:
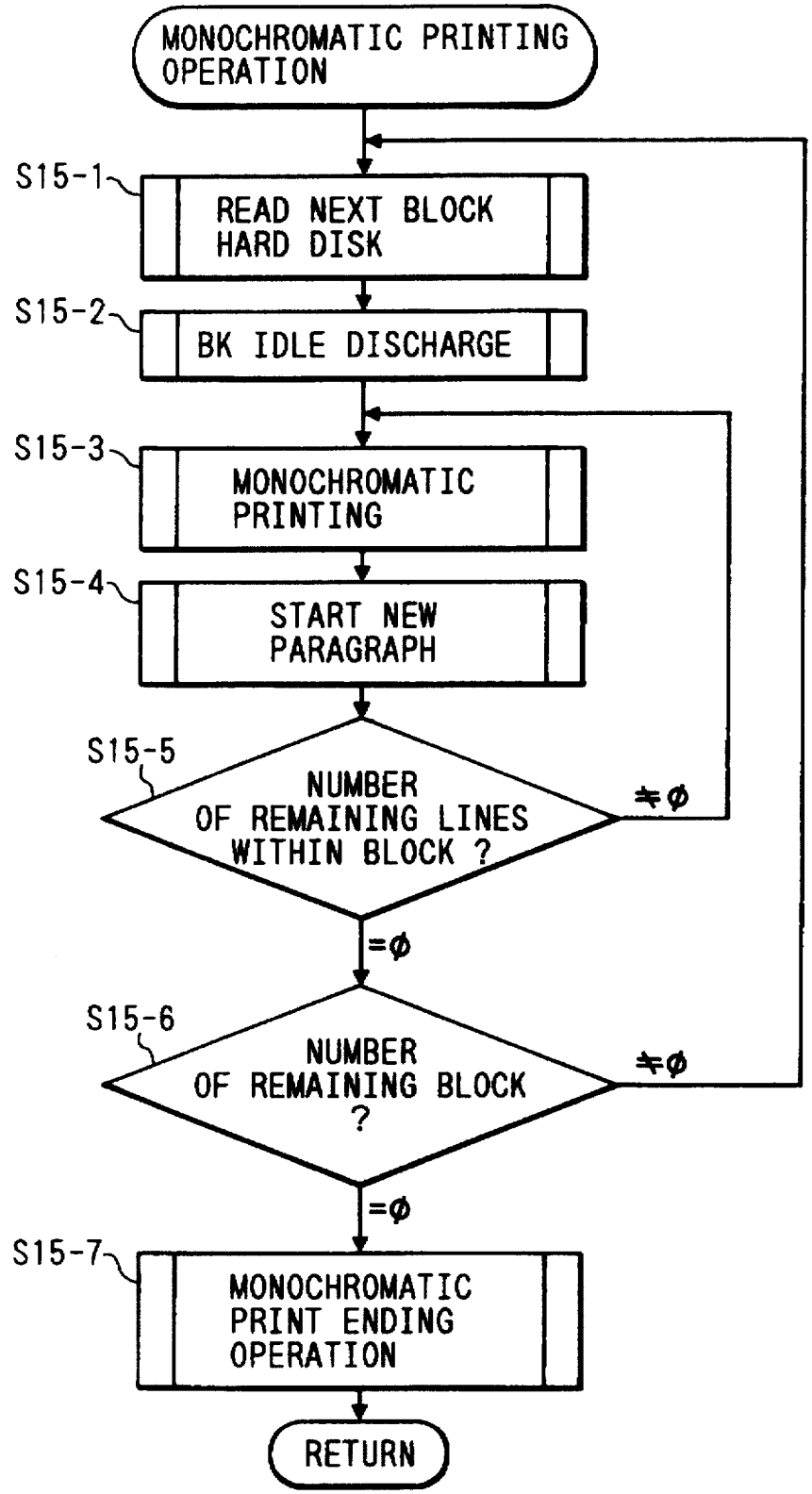
FIG. 15 is a flow chart for explaining a sub-routine monochromatic printing operation shown in FIG. 13.

Now, color printing operation will be described with reference to FIG. 14, and then monochromatic printing operation with reference to FIG. 15.

The color printing operation will now be described. Data preserved in hard disk 60 is read out and subjected to extension in compression/extension processing circuit 128. In this embodiment, image data for individual colors Y, M, C and Bk are read out for each block noted before, i.e., for every eight lines. The individual color image data read out are stored in respective Y, M, C and Bk image memories 107Y, 107M, 107C and 107Bk (step S14-1). The reading of data for every eight lines is by no means limitative, and it is possible to permit line-by-line data reading. In addition, the extension may be executed in real time operation while performing printing, or it may be executed for the whole frame at a time. In this embodiment, at this time color-for-use determining means 61 which is described before using FIG. 4 determines colors to be used among colors Y, M, C and Bk for the next block (step S14-2), and idle discharge or withdrawal discharge is executed only for the heads of the colors to be used (step S14-3). Subsequently, line color printing (step S14-4) and starting new line (step S14-5) are executed while image data is read from image memories 107Y, 107M, 107C and 107Bk. The above sequence is repeated until the number of remaining lines in the block becomes zero (step S14-6), that is, processing for eight lines is repeated.

Now, the distance, by which head carriage 16 is moved in the direction of arrow 40 in FIG. 3 for line color printing, will be described.

As noted earlier, for recording color image over the entire width of paper the position of the carriage at the start of line color printing is such that black ink head 20Bk faces the leading end of paper, and the carriage position at the end of line color printing is such that yellow ink jet head 20Y faces the trailing end of paper. In other words, head carriage 16 reciprocates the start and end positions noted above, and effects printing only while it is moved in the direction of arrow 40. For causing such movement of head carriage 16, CPU 101 provides a command to a control circuit for controlling the state of driving of drive motor 17.

When the number of remaining lines in block becomes zero, the number of remaining blocks which are not yet been printed is checked (step S14-7). If the number is not zero, the routine goes back to step S14-1 to repeat the above sequence. If the number of remaining blocks is equal to zero, a color print ending operation (step S14-6) as will be described later is executed.

Now, monochromatic printing operation will be described. Black image data preserved in hard disk 60 is read out block by block and stored in image memory 107Bk (step S15-1). Then, idle discharge is executed for the black ink head (step S15-2). Then, line monochromatic printing (step S15-3) and starting new line (step S15-4) are executed while reading out image data from image memory 107Bk. The above sequence is repeated until the number of remaining lines in block becomes zero (step S15-5).

Now, the distance, by which head carriage 16 is moved in the direction of arrow 40 for line monochromatic printing, will be described.

As noted earlier, for recording monochromatic image over the entire paper width the carriage position at the time of start of line monochromatic printing is such that black ink jet head 20Bk faces the leading end of paper. That is, head carriage 16 reciprocates the start and end positions noted above and effects printing only while it is moved in the direction of arrow 40. Thus, printing is done quickly, and also the desirability of the apparatus can be improved.

When the number of remaining lines in block becomes zero, this is detected by CPU 101. This detection is effected according to the amount of data printed after being read out from hard disk 60. Then, the number of remaining blocks is checked (step S15-6), and if it is not zero, the routine goes back to step S15-1 to repeat the above sequence. If the number of remaining blocks is zero, a monochromatic print ending operation as will be described later is performed (step S15-7). When the remaining block number becomes zero, this is detected by CPU 101 from the output of compression extension processing circuit 128.

Figure 16:
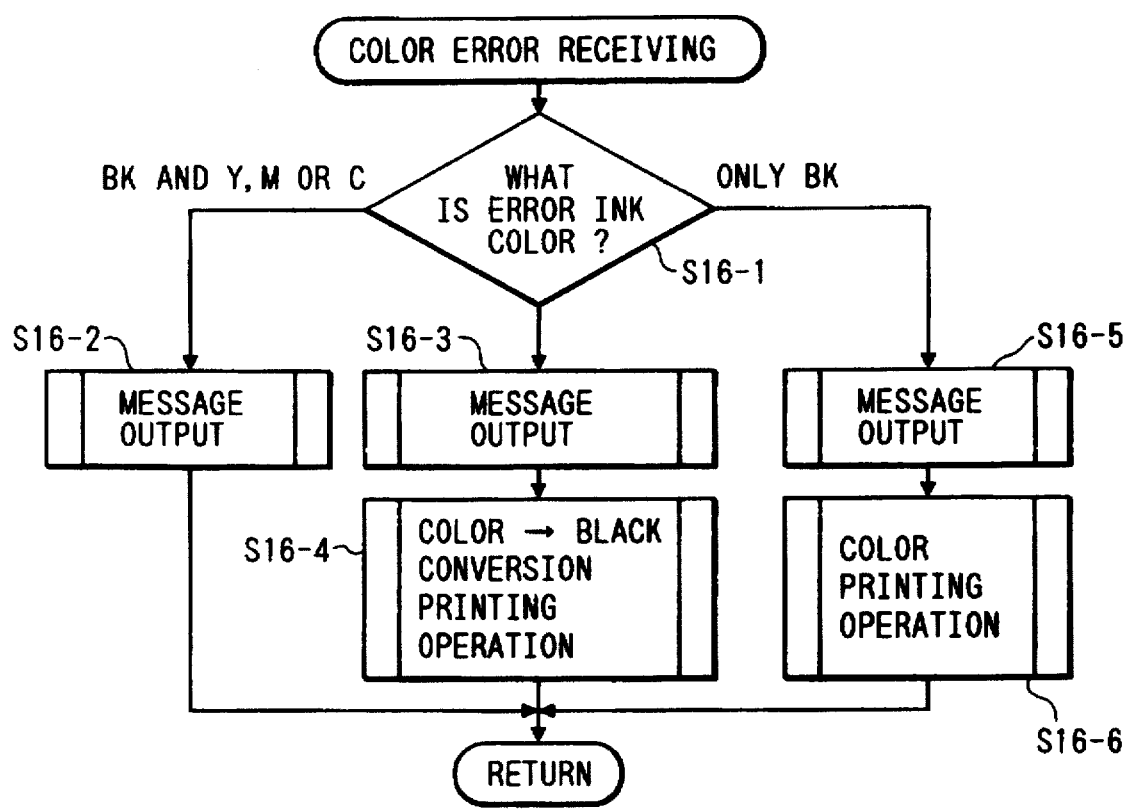
FIG. 16 is a flow chart for explaining a sub-routine color error reception shown in FIG. 12.
Figure 17:
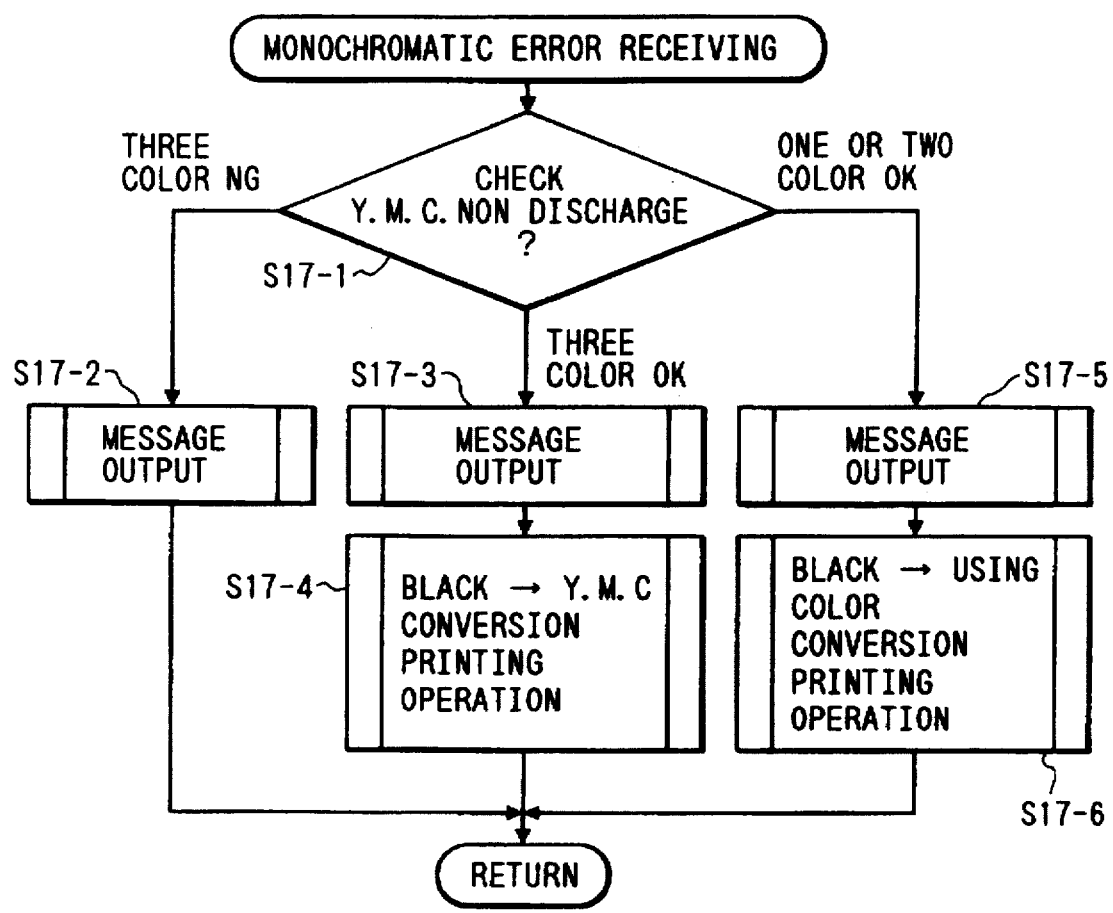
FIG. 17 is a flow chart for explaining a sub-routine monochromatic error reception shown in FIG. 13.

Now, color error reception will be described with reference to FIG. 16, and monochromatic error reception with reference to FIG. 17.

As noted above, the color error reception is effected if ink is insufficient in even a single IJC among those for four colors Y, M, C and Bk or if there is a non-discharge nozzle of even a single one of the four colors. Accordingly, a check is done for a color of IJC for which there is ink shortage or non-discharge (hereinafter the color being referred to as trouble ink color) (step S16-1). The subsequent operation is determined by the result of this check. More specifically, if at least one color among colors Bk, Y, M and C is black and normal, a message for printing trouble color and color image after conversion to monochromatic is displayed on LCD 115 (step S16-3) for color-to-black conversion printing operation (step S16-4).

If black above is the trouble ink, black ink trouble is displayed on LCD 115 (step S16-5), and then color printing operation noted above is performed (S16-6).

Next, monochromatic error reception will be described with reference to FIG. 17. As noted above, monochromatic error reception is done when there is lack of ink or a non-discharge nozzle in IJCBk. However, no check has been done for IJCs of three colors Y, M and C. Therefore, whether these IJCs can be used is checked. To this end, non-discharge check is done for IJCs of three colors Y, M and C (step S17-1), and the following operation is determined according to the result of check.

More specifically, if all three heads for Y, M and C have non-discharge nozzles, a message of trouble in all four colors Y, M, C and Bk is displayed on LCD 115 (step S17-2). If the three heads for Y, M and C can all be used, a message of black ink trouble and printing of black with Y, M and C is displayed on LCD 115 (step S17-3), and black-to-YMC conversion printing operation as will be described later is performed (step S17-4). If one or two of the heads for Y, M and C can be used, a message of black ink trouble and printing black by conversion thereof to a color capable of use is displayed on LCD 115 (step S17-5), and black-to-color-for-use conversion printing operation is performed (step S17-6). If two colors can be used at this time, the priority of determining a color for use is in the order of M, C and Y.

Now, the color-to-black, black-to-YMC and black-to-color-for-use conversion printing operations noted above will be described with reference to FIGS. 18 to 20, respectively.

First, color-to-black conversion printing operation will be described. First, image data for individual colors Y, M, C and Bk preserved in hard disk 60 are read out block by block as noted above and extended in circuit 128 for storing in Y, M, C and Bk image memories 107Y, 107M, 107C and 107Bk for respective colors (step S18-7). Then, Y, M and C color image data is read out for pixel by pixel from image memories 107Y, 107M and 107C, and Y, M and C image data are converted in image conversion means 63 into black image data for storage in image memory 107Bk (step S18-2).

Means for converting color image data into black image data is not particularly described, but it is possible to obtain conversion by multiplying Y, M and C by a predetermined factor and adding together the products, or it may be obtained by taking out sole magenta data. In general, any means may be used so long as color image is digitally converted to density image data.

The subsequent operation is entirely the same as step S15-2 and following steps in the monochromatic printing operation described before in connection with FIG. 15.

Now, black-to-YMC conversion printing operation will be described with reference to FIG. 19. Black image data present in hard disk 60 is read out block by block and stored, extended and stored in image memory 107Bk (step S19-1).

Then, black image data is read out from image memory 197Bk and transferred through DMA controller 117 to image memories 107Y, 107M and 107C (step S19-2). Data in image memory 107Bk is cleared when the inter-memory transfer operation is ended. Then, the idle discharge operation noted above is executed for the heads of three colors Y, M and C (step S19-3). Subsequent operation is entirely same as the color printing operation noted above, i.e., step S14-4 and following steps in FIG. 14.

Now, black-to-color-for-use conversion printing operation will be described with reference to FIG. 20. Black image data stored in hard disk 60 is read out block by block and stored in image memory 107Bk (step S20-1).

Then, one of colors that can be used is determined with respect to the condition noted above, and black image data read out pixel by pixel from image memory 107Bk is transferred in the image memory for that color (step S20-2).

At this time, data in image memory 107Bk is cleared at the time of end of the inter-memory transfer operation. Then, idle discharge or withdrawal discharge noted above is executed for the head for color for use (step S20-3). Subsequent operation is entirely the same as step S14-4 and following steps in the color printing operation shown in FIG. 14.

Figure 18:
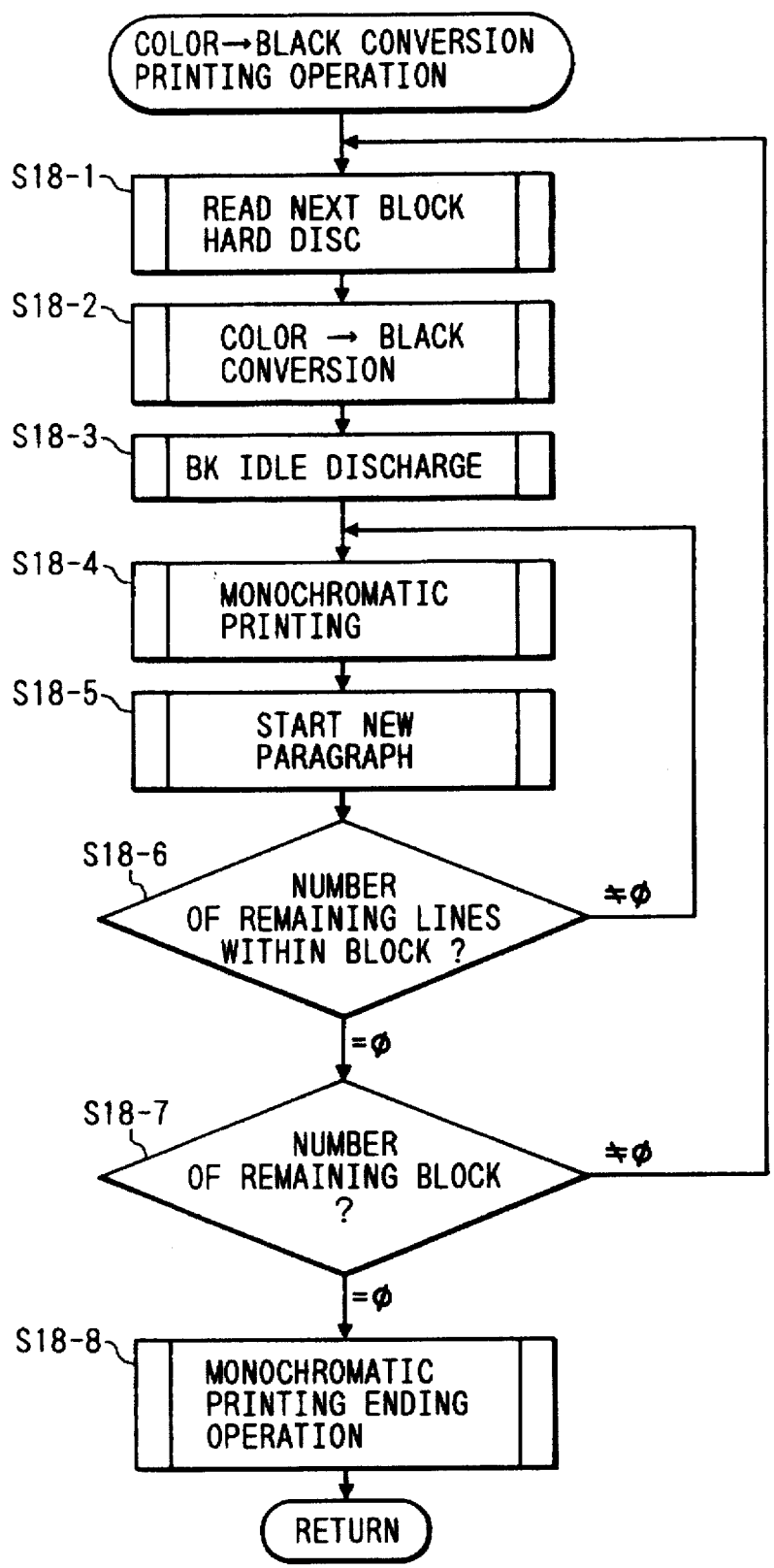
FIG. 18 is a flow chart for explaining a sub-routine color-to-black conversion printing operation shown in FIG. 16.
Figure 19:
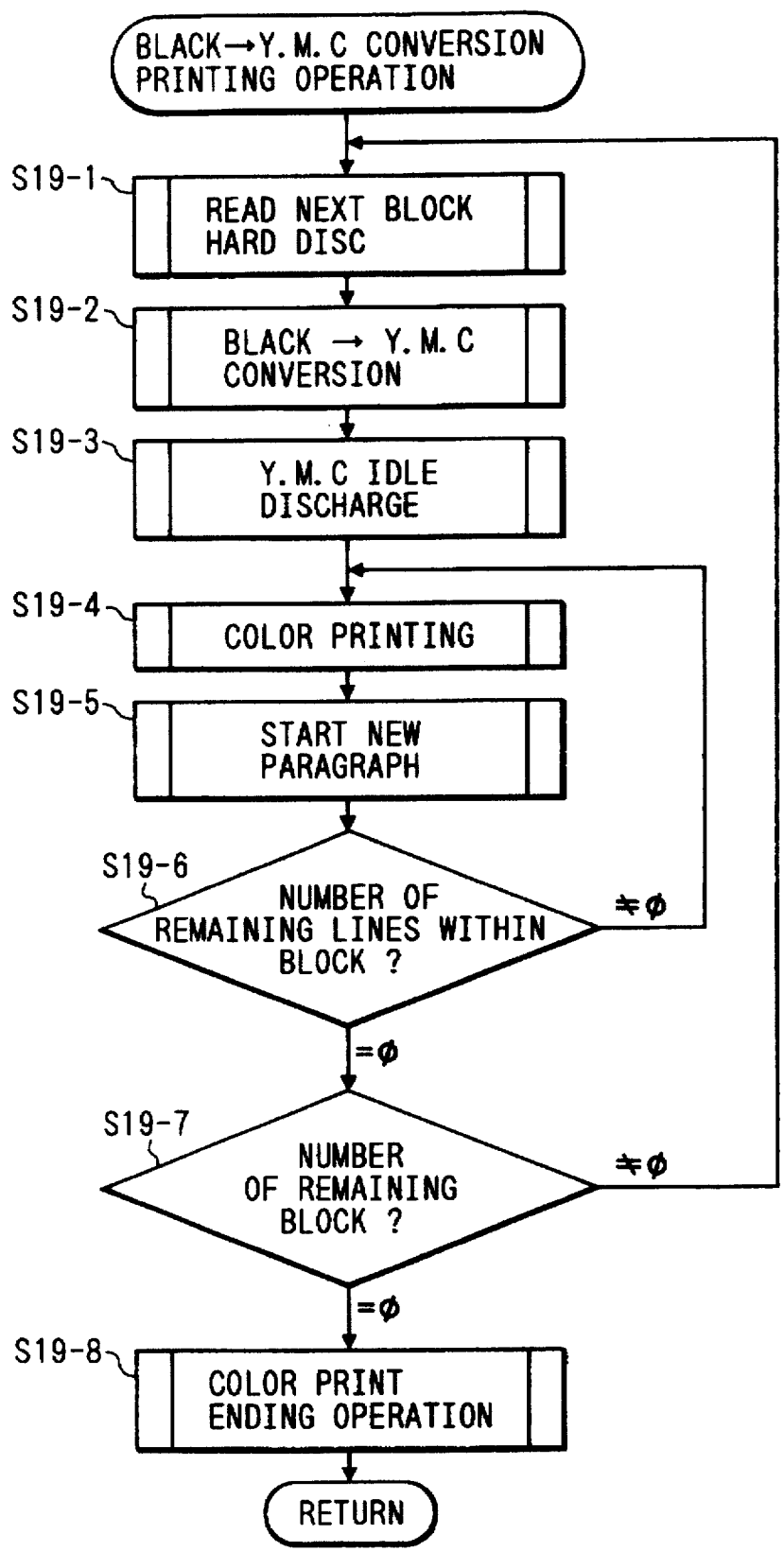
FIG. 19 is a flow chart for explaining a sub-routine black-to-Y, M, C conversion printing operation shown in FIG. 17.
Figure 20:
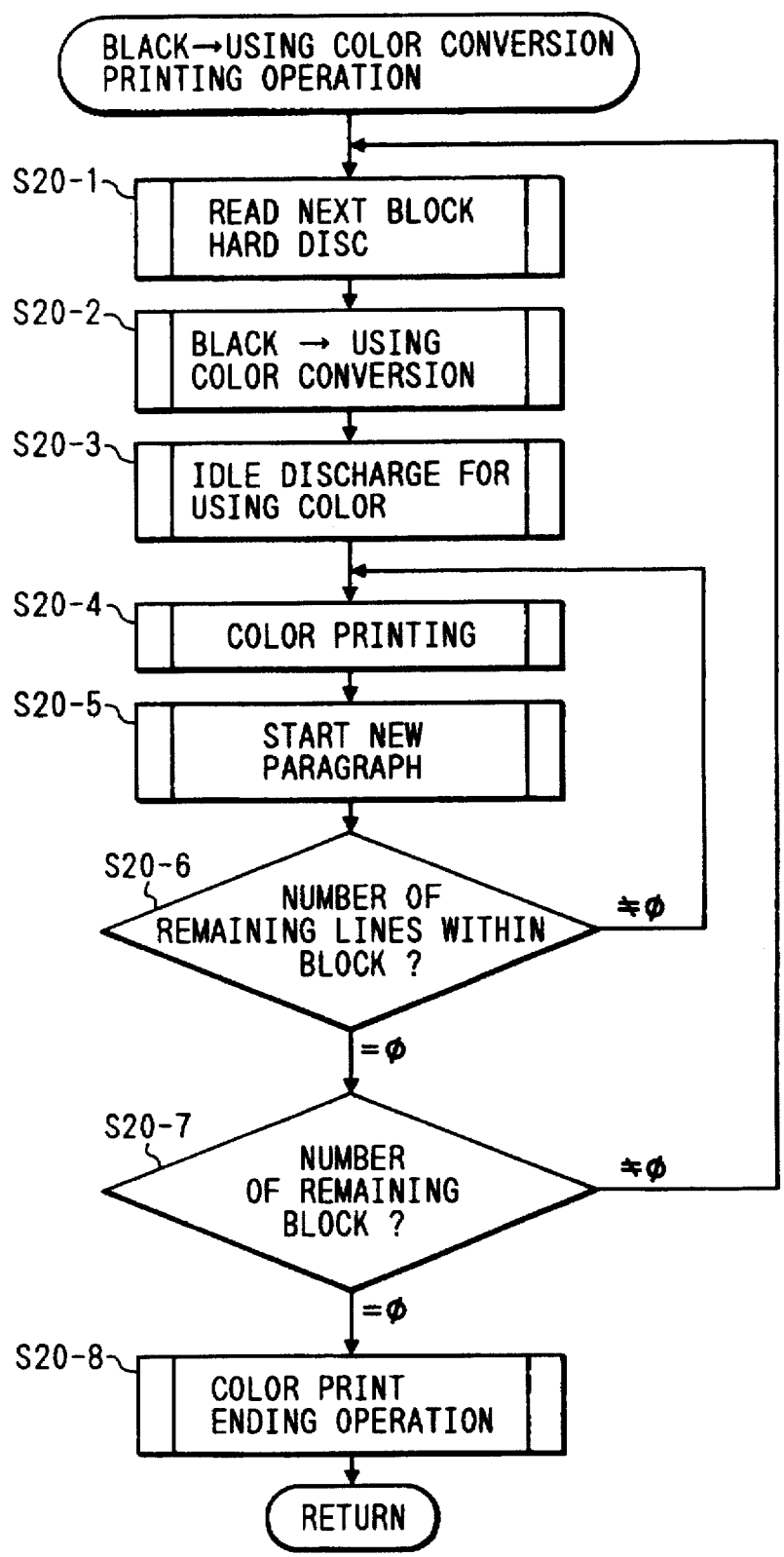
FIG. 20 is a flow chart for explaining a sub-routine black-to-color-in-use conversion printing operation shown in FIG. 17.

Steps S18-3, S19-3 and S20-3 in respective FIGS. 18 to 20 are not particularly necessary in a very initial stage of the color printing and are executed for obtaining more reliable printing operation without print error.

Figure 21:
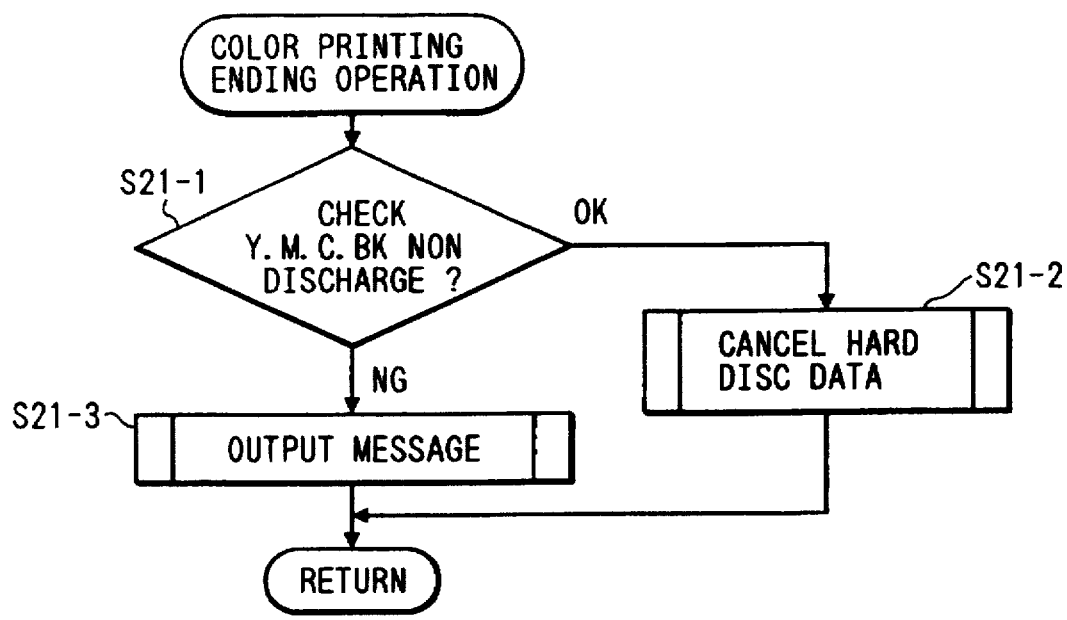
FIG. 21 is a flow chart for explaining a sub-routine color print ending operation shown in FIG. 14.
Figure 22:
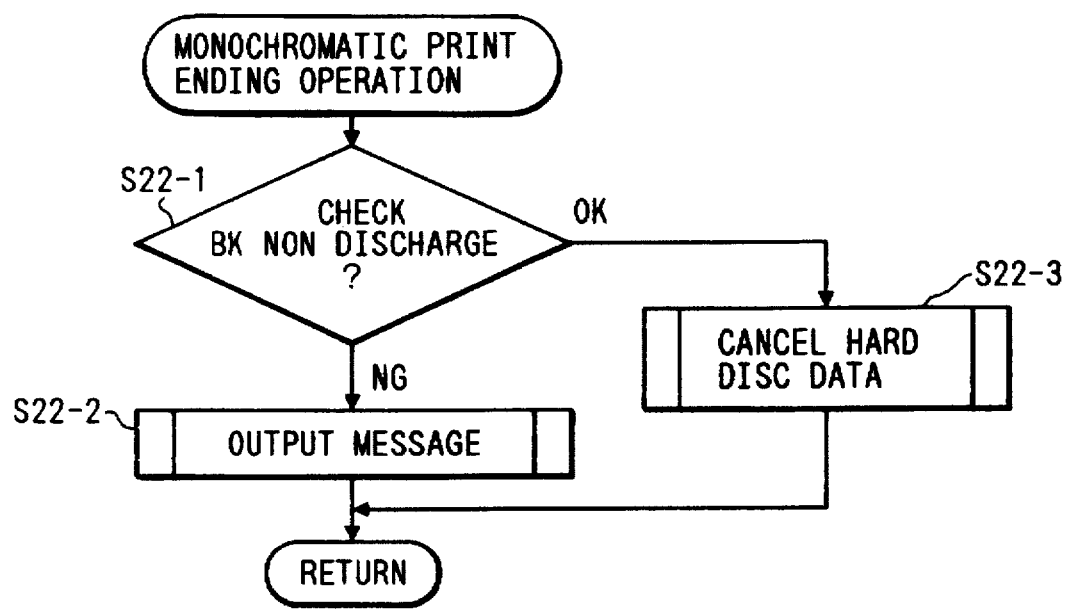
FIG. 22 is a flow chart for explaining a sub-routine monochromatic print ending operation shown in FIG. 15.

Now, the color and monochromatic print ending operations noted above will be described with reference to respective FIGS. 21 and 22.

First, color print ending operation will be described. After the end of printing of one page, the non-discharge check as noted above is executed for four colors Y, M, C and Bk (step S21-1). If the check yields "OK" for all the four colors, it is determined that normal printing could be obtained. Thus, data in hard disk 60 is cancelled (step S21-2), or if next data is received, it is written by overlap writing so that it can no longer be read out. If there is "NG" for even a single color, it is determined that there is a possibility of failure of normal printing. In this case, while holding data in hard disk 60 a message of possibility of defective image is displayed on LCD 115 and is also transmitted to the transmitting side (step S21-3).

In this case, if there is no remaining memory capacity in each of memories 107Y, 107M, 107C and 107Bk or hard disk 60 when next data is received, data in hard disk 60 is held as such for image signal which is not normally printed even by inhibiting the writing of the received data in memory.

Monochromatic print ending operation will now be described. After printing of one page is ended, the non-discharge check is executed for black (step S22-1). If the result of the check is "NG", it is determined that there is possibility of failure of normal printing, and a message of possibility of defective image is displayed on LCD 115 (step S22-2). If the result of the non-discharge check is "OK", data in hard disk 60 is cancelled (Step S22-3).

The processing of the data written in memory is the same as in the case described before in connection to FIG. 21.

Figure 8:
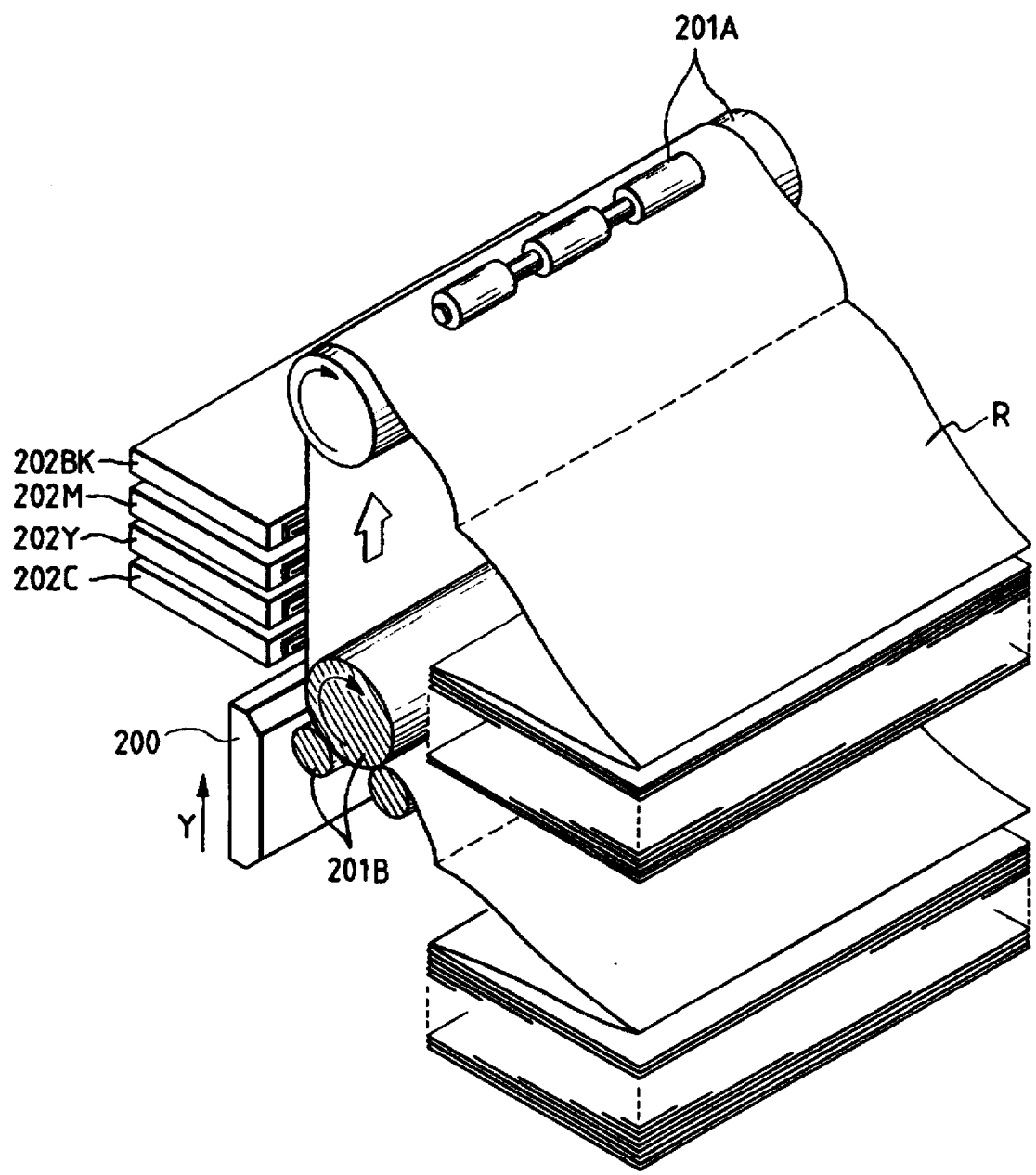
FIG. 8 is a perspective view showing a full-line printer as a different embodiment of the invention.

The present invention is not only applicable to the above serial printer but is also suitably applicable to a facsimile apparatus provided with an ink jet recording apparatus having a full line type recording head having a length corresponding to the width of the largest recording medium capable of recording by the recording apparatus shown in FIG. 8.

Refering to FIG. 8, designated at 201A and 201B are pair rollers for feeding recording medium R in a pinched state in an auxiliary scanning direction Vs shown by arrow. Designated at 202Bk, 202Y, 202M and 202C are full multiple type recording heads for performing recording in black, yellow, magenta and cyan, respectively, with nozzles arranged over the entire width of recording medium R. These heads are arranged in the mentioned order in the direction of feed of recording medium.

Designated at 200 is a recovery system, which undertakes withdrawal operation from each ink jet head, idle discharge operation therefrom and ink discharge recovery processing such as capping (referred to as discharge recovery processing). In these processings, the system faces the recording heads 202Bk, 202Y, 202M and 202C instead of recording medium R. In this embodiment, the number of times of the discharge recovery processing start can be extremely reduced owing to preliminary heating effected at a suitable timing.

Particularly, since in this embodiment the heads are arranged in the order of C, Y, M and Bk from the bottom of the Figure, in the black receiving operation recovery system 200 first executes recovery operation for the individual heads for Y, M, C and Bk, and then it is moved to a position that only the head for Bk is exposed to paper while the other heads for M, Y and C are not.

Since the heads for M, Y and C thus remain capped, reliability can be improved.

Figure 9:
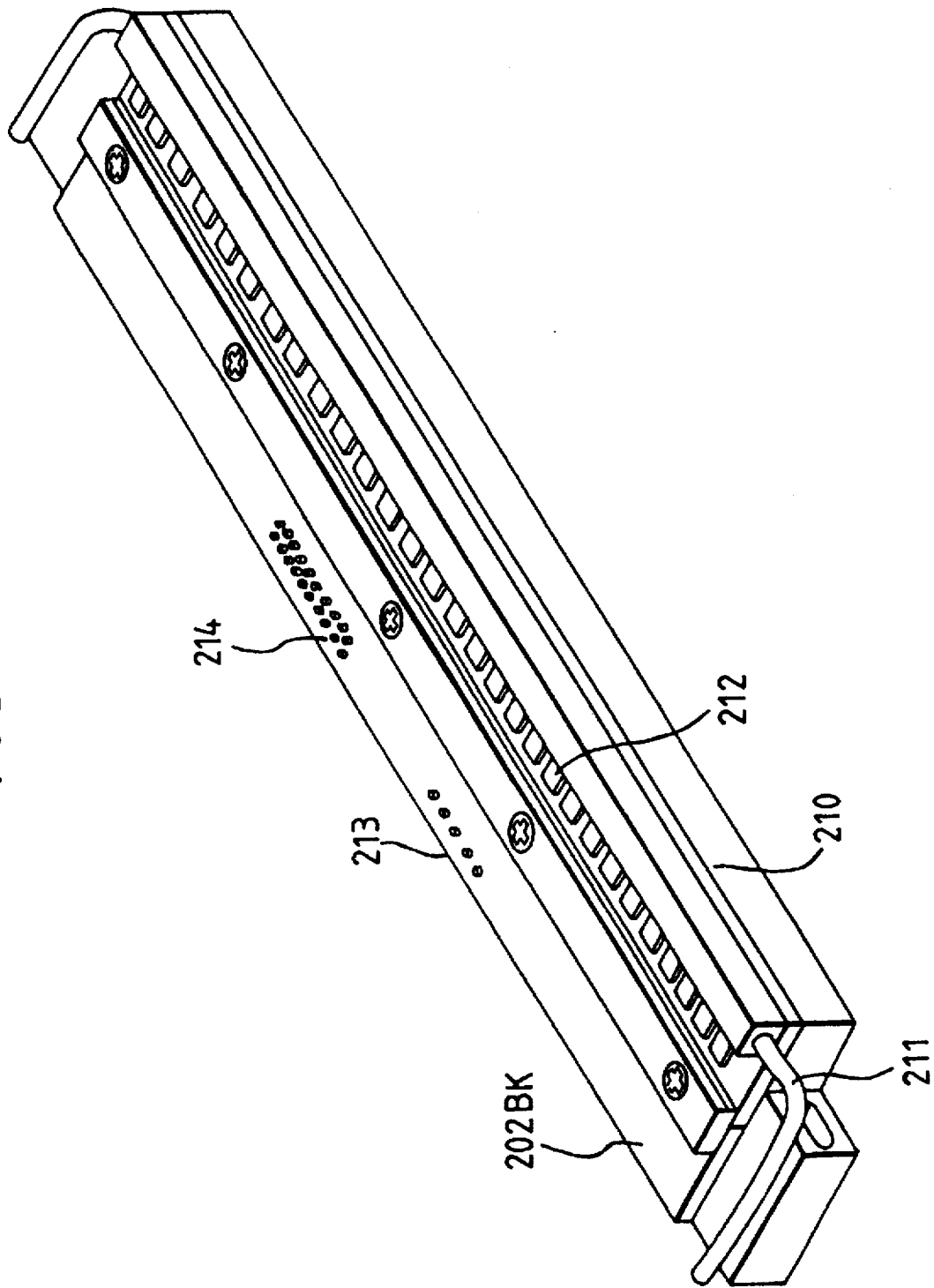
FIG. 9 is an enlarged-scale view showing an essential part of FIG. 8.
Figure 10:
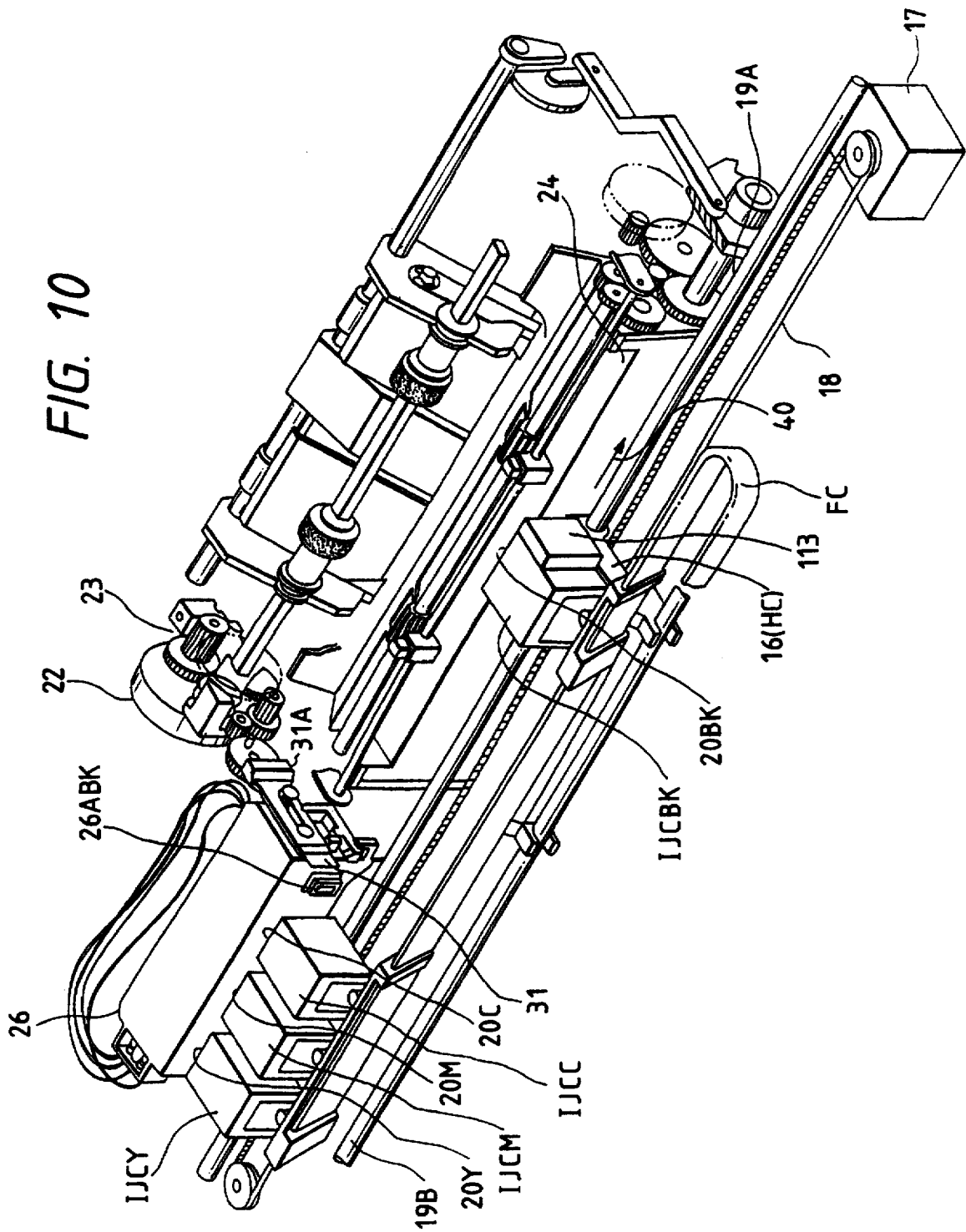
FIG. 10 is a view showing a different example from the construction shown in FIG. 3.

FIG. 9 is a perspective view showing one of recording heads 202Bk, 202Y, 202M and 202C shown in FIG. 8. Referring to FIG. 9, designated at 210 is an ink nozzle, at 211 is an ink supply ductline, and at 212 are a plurality of IC circuits (as drive circuits) for driving electricity-to-heat conversion elements. Designated at 213 and 214 are terminals, to which drive signals are supplied.

The invention is applicable to the facsimile apparatus having such a full line type printer with the same control procedure as described before.

Further while in the embodiment of FIG. 3 the color ink heads and black ink head are mounted on the same carriage, this is by no means limitative. For example, the invention is similarly applicable to a case as shown in FIG. 1, in which color ink heads are mounted on a carriage separate from a black ink head carriage.

Further, the invention is applicable as well to a facsimile apparatus having a recording system consisting of a commonly termed piezoelectric ink jet recording apparatus using piezoelectric elements as ink jet energy source.

Others

The invention is applicable various recording systems irrespective of coloring materials employed, and particularly provided excellent effects when applied to an ink jet recording system, more specifically, recording head and recording apparatus of bubble jet type. This is so because with this system it is possible to attain increased density and fineness of recording.

Typical structure and principles are suitably based on principles shown in, for instance, U.S. Pat. Nos. 4,723,129 and 4,740,796. This system is applicable to either commonly termed on-demand type or continuance type. Particularly, it is effective for the on-demand type in that heat energy may be generated in an electricity-to-heat converter disposed in correspondence to a sheet holding ink or an ink path by impressing on the converter at least one drive signal corresponding to recording information and providing for quick temperature rise exceeding nucleate boiling, thus generating film boiling on the heat-acting surface of the recording head to form bubbles in ink in one-to-one correspondence to the drive signal. With growth and shrinkage of bubbles at least one ink drop is formed with discharge of ink through nozzle opening. The drive signal is suitable a pulse signal. In this case, growth and shrinkage of bubbles can be obtained adequately to attain ink discharge of excellent response character. The pulse drive signal is suitably those described in U.S. Pat. Nos. 4,463,359 and 4,345,262. Further, more excellent recording can be obtained by adopting conditions shown in U.S. Pat. No. 4,313,124 concerning the rate of temperature rise of the heat-acting surface noted above.

As the structure of the recording head according to the invention may be used, in addition to a combination structure (of a linear or orthogonal ink path) comprising a nozzle, an ink path and an electricity-to-heat converter, a structure shown in U.S. Pat. Nos. 4,558,333 and 4,459,600. Further, the effects of the invention are obtainable by adopting structures based on Japanese Patent Laid-Open No. 59-123670 disclosing a structure, in which a common slit to a plurality of electricity-to-heat converters serve as nozzle thereof, and Japanese Patent Laid-Open No. 59-138461 disclosing a structure, in which an opening for absorbing heat energy pressure waves faces a nozzle. This means that according to the invention reliable and efficient recording can be obtained irrespective of the status of recording head.

Further, recovery means and spare or auxiliary means used for the recording head according to the invention are not limited to those described above, and for stable recording it is possible to use, for the recording head, capping means, cleaning means, pumping or withdrawing means, preliminary heating means consisting of an electricity-to-heat converter or a separate heating element or a combination of these elements.

Further, as for the kinds and number of mounted recording heads, only a single head for monochromatic ink may be provided, or a plurality of heads may be provided for a corresponding number of ink kinds different in recording color and/or density.

Further, the ink jet recording apparatus of this embodiment may be used as image output terminal of a data processing apparatus such as a computor or may be a copier combined with a reader or the like or a facsimile apparatus having transmitting and receiving functions.

Further, in communication control unit NCU of this embodiment, if the receiver is an image communication apparatus in psuedo conformity to G3 facsimile, it is possible to transmit a transmitting mode, for instance a color mode or monochromatic mode, to the receiver according to a nonstandard initialization descrimination signal, for instance an NSF signal. For example, in case of an image communication apparatus in psuedo conformity to G4 facsimile, it may be adapted to permit transmission of a transmitting mode, for instance a color mode or a monochromatic mode, to the receiver according to a user-user signal shown in Specification 4.5.24, ISDN Network Interface Part 3 of the TTC Reccommendation. Particularly, with the ISDN network the transmission time can be reduced, which is very convenient for an apparatus in which received data is tentatively stored in memory as in this embodiment.

As have been shown in the foregoing, with the above embodiment, i.e., a color facsimile apparatus having an ink jet recording apparatus provided with a plurality of color ink heads for different colors, which comprises recovery processing means for recovering the state of ink discharge of said ink heads, color determining means for monitoring the print color of the next block, one block being constituted by a predetermined number of lines, and control means for selecting heads by executing recovery processing according to a signal from color determining means and causing the recovery processing of heads selected for every block recording, the recovery processing is caused for only the heads for printing colors used for the next block.

Actually, it is rare to use all four colors Y, M, C and Bk during page printing or serial printing, and it is though that there are many cases when there is a full color photograph in a portion of a black character original or cases when limited colors are used for some portions such as graphs and drawings.

In case where an ink jet printer is used in color facsimile, if recovery processing is done by operating four recovery mechanisms for respective colors Y, M, C and Bk whenever a predetermined number of lines are printed, the recovery operation is carried out even for a head of a color which is not used at all for the predetermined number of lines noted above which are printed between adjacent recovery operations. This means a waste of ink. With the embodiment described above, in which recovery processing is carried out only for heads of printing colors used for the next block, it is possible to prevent excessive discharge of ink of all colors Y, M, C and Bk and extend the life of the ink cartridge.

Other Embodiment

In the above embodiment the printing colors used for the next block are monitored only in the color printing mode. However, this is by no means limitative. For example, it is possible to permit the next block printing color monitoring in a separate mode, in with a plurality of different colors, for instance colors Bk and M, are used.

Further, while in the above embodiment a plurality of lines of image data are set as a predetermined quantity of image data, this is by no means limitative. For example, data less than one line or for one half line or other quantity may be set as predetermined data quantity.

With this embodiment, it is possible to prevent wasteful recovery operation and permit stable receiving operation as color facsimile.

We claim:

1. A data receiving apparatus comprising:

receiving means for receiving data transmitted through a transmission path for recording by an ink jet recording means for recording by emitting ink, the ink jet recording means having plural recording elements;

discrimination means for driving in order said plural recording elements to detect an ink emission state, thereby discriminating non-emission of ink;

control means for causing said discrimination means to discriminate non-emission of ink after a completion of recording the received data; and storage means for storing said received data, and wherein said ink jet recording means is able to record the data stored in said storage means, wherein said control means erases the data stored in the storage means if no non-emission of ink is discriminated by said discrimination means.

2. A data receiving apparatus according to claim 1, wherein said ink jet recording means comprises an ink jet head which discharges ink by utilizing heat energy.

3. A data receiving apparatus according to claim 2, wherein said ink jet head discharges ink by film boiling.

4. A data receiving apparatus comprising:

receiving means for receiving data transmitted through a transmission path for recording by an ink jet recording means for recording by emitting ink, the ink jet recording means having plural recording elements;

discrimination means for driving in order said plural recording elements to detect an ink emission state, thereby discriminating non-emission of ink;

control means for causing said discrimination means to discriminate non-emission of ink after a completion of recording the received data;

storage means for storing said received data;

erasing means for erasing the data stored in said storage means; and recovery processing means for recovering a state of ink discharge of said ink jet recording means, and wherein further non-emission discrimination is executed before a start of recording the received data.

5. A data receiving apparatus according to claim 4, wherein said recovery processing means executes recovery processing if non-emission of ink is discriminated by the further non-emission discrimination.

6. A data receiving apparatus according to claim 4, wherein said ink jet recording means comprises an ink jet head which discharges ink by utilizing heat energy.

7. A data receiving apparatus according to claim 6, wherein said ink jet head discharges ink by film boiling.

8. A data receiving apparatus comprising:

receiving means for receiving data transmitted through a transmission path for recording by an ink jet recording means for recording by emitting ink, the ink jet recording means having plural recording elements;

discrimination means for driving in order said plural recording elements to detect an ink emission state, thereby discriminating non-emission of ink;

control means for causing said discrimination means to discriminate non-emission of ink after a completion of recording the received data;

storage means for storing said received data; and erasing means for erasing the data stored in said storage means, wherein said control means transmits an error signal to a transmitter which transmits the data to be received by said receiving means if non-emission of ink is discriminated after the completion of recording.

9. A data receiving apparatus according to claim 8, wherein said ink jet recording means comprises an ink jet head which discharges ink by utilizing heat energy.

10. A data receiving apparatus according to claim 9, wherein said ink jet head discharges ink by film boiling.

11. A data receiving apparatus comprising:

receiving means for receiving data transmitted through a transmission path for recording by an ink jet recording means for recording by emitting ink, the ink jet recording means having plural recording elements and comprising means for emitting ink by utilizing heat energy;

discrimination means for driving in order said plural recording elements to detect an ink emission state, thereby discriminating non-emission of ink;

control means for causing said discrimination means to discriminate non-emission of ink after a completion of recording the received data;

storage means for storing said received data; and erasing means for erasing the data stored in said storage means.

12. A data receiving apparatus comprising:

receiving means for receiving data transmitted through a transmission path for recording by an ink jet recording means for recording by emitting ink, the ink jet recording means having plural recording elements;

discrimination means for driving in order said plural recording elements to detect an ink emission state, wherein said discrimination means discriminates non-emission of ink by reading a non-emission detecting pattern recorded by said ink jet recording means;

control means for causing said discrimination means to discriminate non-emission of ink after a completion of recording the received data;

storage means for storing said received data; and erasing means for erasing the data stored in said storage means.

13. A data receiving apparatus according to claim 12, wherein said ink jet recording means comprises an ink jet head which discharges ink by utilizing heat energy.

14. A data receiving apparatus according to claim 13, wherein said ink jet head discharges ink by film boiling.

15. A printing apparatus comprising:

ink jet printing means for printing received data by emitting ink, said ink jet printing means having plural recording elements;

discrimination means for driving in order said plural recording elements to detect an ink emission state, thereby discriminating non-emission of ink;

control means for causing said discrimination means to discriminate non-emission of ink after a completion of printing the received data; and storage means for storing the data to be printed by said ink jet printing means, and wherein said control means erases the data stored in said storage means in response to a detection of no non-emission of ink which is made by said discrimination means.

16. A printing apparatus according to claim 15, wherein said ink jet printing means discharges ink by utilizing heat energy.

17. A printing apparatus according to claim 16, wherein said ink jet printing means comprises an ink jet head which discharges ink by utilizing heat energy.

18. A printing apparatus according to claim 17, wherein said ink jet head discharges ink by film boiling.

19. A printing apparatus comprising:

ink jet printing means for printing received data by emitting ink, said ink jet printing means having plural recording elements;

discrimination means for driving in order said plural recording elements to detect an ink emission state, thereby discriminating non-emission of ink;

control means for causing said discrimination means to discriminate non-emission of ink after a completion of printing the received data; and further detection means for detecting non-emission of ink in said ink jet printing means before a start of printing the received data.

20. A printing apparatus according to claim 19, further comprising recovery processing means for recovering a state of ink discharge of said ink jet printing means, and wherein said recovery processing means executes recovery processing in response to a detection of non-emission of ink which is made by said further detection means.

21. A printing apparatus according to claim 19, wherein said ink jet printing means comprises an ink jet head which discharges ink by utilizing heat energy.

22. A printing apparatus according to claim 21, wherein said ink jet head discharges ink by film boiling.

23. A printing apparatus comprising:

ink jet printing means for printing received data by emitting ink, said ink jet printing means having plural recording elements;

discrimination means for driving in order said plural recording elements to detect an ink emission state, thereby discriminating non-emission of ink;

control means for causing said discrimination means to discriminate non-emission of ink after a completion of recording the received data, wherein said control means outputs an error signal in response to a detection of non-emission of ink which is made by said discrimination means;

storage means for storing said received data; and erasing means for erasing the data stored in said storage means.

24. A printing apparatus according to claim 23, wherein said ink jet printing means comprises an ink jet head which discharges ink by utilizing heat energy.

25. A printing apparatus according to claim 24, wherein said ink jet head discharges ink by film boiling.

26. A printing apparatus comprising:

ink jet printing means for printing received data by emitting ink, said ink jet printing means having plural recording elements;

discrimination means for driving in order said plural recording elements to detect an ink emission state, wherein said discrimination means discriminates non-emission of ink by reading a non-emission detecting pattern printed by said ink jet printing means;

control means for causing said discrimination means to discriminate non-emission of ink after a completion of printing the received data;

storage means for storing said received data; and erasing means for erasing the data stored in said storage means.

27. A printing apparatus according to claim 26, wherein said ink jet printing means comprises an ink jet head which discharges ink by utilizing heat energy.

28. A printing receiving apparatus according to claim 27, wherein said ink jet head discharges ink by film boiling.

29. A color image receiving apparatus for use with a color ink jet recording means for recording color image data by using plural kinds of ink, the color ink jet recording means having plural ink jet heads each provided with plural recording elements, the apparatus comprising:

receiving means for receiving color image data transmitted through a transmission path;

discrimination means for driving in order the plural recording elements of the plural ink jet heads to detect an ink emission state, thereby discriminating non-emission of ink from each of the ink jet heads;

control means for causing said discrimination means to discriminate non-emission of ink after a completion of recording the color image data; and storage means for storing the color image data to be recorded by said color ink jet recording means, and wherein said control means erases the color image data stored in said storage means in response to a detection made by said discrimination means that all of the plural kinds of ink can be discharged.

30. A color image receiving apparatus according to claim 29, wherein said color ink jet recording means comprises an ink jet head which discharges ink by utilizing heat energy.

31. A color image receiving apparatus according to claim 30, wherein said ink jet head discharges ink by film boiling.

32. A color image receiving apparatus for use with a color ink jet recording means for recording color image data by using plural kinds of ink, the color ink jet recording means having plural ink jet heads each provided with plural recording elements, the apparatus comprising:

receiving means for receiving color image data transmitted through a transmission path;

discrimination means for driving in order the plural recording elements of the plural ink jet heads to detect an ink emission state, thereby discriminating non-emission of ink from each of the ink jet heads;

control means for causing said discrimination means to discriminate non-emission of ink after a completion of recording the color image data; and further detection means for detecting whether or not each of plural kinds of ink in color ink jet recording means can be discharged before a start of recording the color image data.

33. A color image receiving apparatus according to claim 32, wherein said color ink jet recording means comprises an ink jet head which discharges ink by utilizing heat energy.

34. A color image receiving apparatus according to claim 33, wherein said ink jet head discharges ink by film boiling.

35. A color image printing apparatus comprising:

color ink jet printing means for printing color image data by using plural kinds of ink, the color ink jet recording means having plural ink jet heads each provided with plural recording elements;

discrimination means for driving in order the plural recording elements of the plural ink jet heads to detect an ink emission state, thereby discriminating non-emission of ink from each of the ink jet heads;

control means for causing said discrimination means to discriminate non-emission of ink after a completion of printing the color image data; and storage means for storing the color image data to be printed by said color ink jet printing means, and wherein said control means erases the color image data stored in said storage means in response to a detection made by said discrimination means that all of the plural kinds of ink can be discharged.

36. A color image printing apparatus according to claim 35, wherein said color ink jet printing means comprises an ink jet head which discharges ink by utilizing heat energy.

37. A color image printing apparatus according to claim 36, wherein said ink jet head discharges ink by film boiling.

38. A color image printing apparatus comprising:

color ink jet printing means for printing color image data by using plural kinds of ink, the color ink jet recording means having plural ink jet heads each provided with plural recording elements;

discrimination means for driving in order the plural recording elements of the plural ink jet heads to detect an ink emission state, thereby discriminating non-emission of ink from each of the ink jet heads;

control means for causing said discrimination means to discriminate non-emission of ink after a completion of printing the color image data; and further detection means for detecting whether or not each of plural kinds of ink in said color ink jet printing means can be discharged before a start of recording the color image data.

39. A color image printing apparatus according to claim 38, wherein said color ink jet printing means comprises an ink jet head which discharges ink by utilizing heat energy.

40. A color image printing apparatus according to claim 39, wherein said ink jet head discharges ink by film boiling.

41. A data receiving apparatus for use with an ink jet recording means for recording data by emitting ink, the apparatus comprising:

receiving means for receiving data transmitted through a transmission path;

discrimination means for driving, in order, plural recording elements provided in the ink jet recording means to detect an ink emission state, thereby discriminating non-emission of the ink;

storage means for storing data to be recorded by the ink jet recording means; and means for erasing the data stored in said storage means in response to a result of a discrimination operation by said discrimination means, wherein said discrimination means executes the discrimination operation after a completion of recording by the ink jet recording means of a representation of at least some data received by said receiving means.

42. An apparatus according to claim 41, wherein said discrimination means further comprises means for detecting a non-discharge of ink in the ink jet recording means before a start of recording of the data received by said receiving means.

43. An apparatus according to claim 42, further comprising recovery means for recovering a state of ink discharge of the ink jet recording means, wherein said recovery means executes recovery processing in response to a detection of the non-discharge of ink.

44. A data recording apparatus comprising:

ink jet recording means for recording a representation of received data on a recording medium by emitting ink, said ink jet recording means being provided with plural recording elements;

discrimination means for driving the plural recording elements, in order, to detect an ink emission state, thereby discriminating non-emission of the ink;

storage means for storing data to be recorded by said ink jet recording means;

means for erasing the data stored in said storage means in response to a result of a discrimination operation by said discrimination means, wherein said discrimination means executes the discrimination operation after a completion of recording by said ink jet recording means of a representation of at least some of the received data.

45. An apparatus according to claim 44, wherein said discrimination means further comprises means for detecting a non-discharge of ink in the ink jet recording means before a start of recording of the data received by said receiving means.

46. An apparatus according to claim 45, further comprising recovery means for recovering a state of ink discharge of the ink jet recording means, wherein said recovery means executes recovery processing in response to a detection of the non-discharge of ink.

47. An apparatus according to claim 41 or 44, further comprising means for outputting an error signal in response to the detection of non-discharge of ink by said detection means.

48. An apparatus according to claim 41, wherein the ink jet recording means is a color ink jet recording means, and said receiving means receives color image data representative of a color image transmitted through the transmission path, and said discrimination means detects if each of a plurality of kinds of ink in the color ink jet recording means has been discharged by a number of ink jets in the color ink jet recording means through operation of the color ink jet recording means and to execute such detection after a completion of recording by the color ink jet recording means of a representation of at least some of the color image data received by said receiving means.

49. A recording apparatus according to claim 44, wherein said ink jet recording means records a representation of color image data representative of a color image by using a plurality of kinds of ink, and said discrimination means detects, by detecting a non-discharge detection pattern recorded by said ink jet recording means, if each of the plurality of kinds of ink in said ink jet recording means has been discharged by a number of ink jets in said recording means and to execute such detection after a completion of recording by said ink jet recording means of a representation of at least some of the color image data.

50. An apparatus according to claim 48 or 49, further comprising storage means for storing the color image data to be recorded by said recording means and means for erasing a color image stored in said storage means in response to a detection by said discrimination means that all of the plural kinds of ink can be discharged.

51. An apparatus according to any one of claims 41, 44, 48 and 49, wherein said discrimination means detects a non-discharge of ink by reading a non-discharge detection pattern recorded by said ink jet recording means.

52. An apparatus according to claim 47, wherein said discrimination means detects a non-discharge of ink by reading a non-discharge detection pattern recorded by said ink jet recording means.

53. An apparatus according to claim 50, wherein said discrimination means detects a non-discharge of ink by reading a non-discharge detection pattern recorded by said ink jet recording means.

54. An apparatus according to any one of claims 41, 44, 48 and 49, wherein the ink jet recording means discharges ink by utilizing heat energy.

55. An apparatus according to claim 47, wherein the ink jet recording means discharges ink by utilizing heat energy.

56. An apparatus according to claim 50, wherein the ink jet recording means discharges ink by utilizing heat energy.

57. An apparatus according to claim 51, wherein the ink jet recording means discharges ink by utilizing heat energy.

58. An apparatus according to claim 52, wherein the ink jet recording means discharges ink by utilizing heat energy.

59. An apparatus according to claim 53, wherein the ink jet recording means discharges ink by utilizing heat energy.

60. An apparatus according to claim 54, wherein the ink jet recording means includes an ink jet head which discharges ink by filmy effervescence.

61. An apparatus according to claim 55, wherein the ink jet recording means includes an ink jet head which discharges ink by filmy effervescence.

62. An apparatus according to claim 56, wherein the ink jet recording means includes an ink jet head which discharges ink by filmy effervescence.

63. An apparatus according to claim 57, wherein the ink jet recording means includes an ink jet head which discharges ink by filmy effervescence.

64. An apparatus according to claim 58, wherein the ink jet recording means includes an ink jet head which discharges ink by filmy effervescence.

65. An apparatus according to claim 59, wherein the ink jet recording means includes an ink jet head which discharges ink by filmy effervescence.

66. A method of receiving data, comprising the steps of:
receiving data transmitted through a transmission path;
storing data to be recorded by the ink jet recording means;
recording a predetermined quantity of data stored in said storing step by using an ink jet recording means for recording by emitting ink, the ink jet recording means having plural recording elements;
driving, after said recording step, the plural recording elements in order, so as to detect an ink emission state, thereby discriminating non-emission of the ink; and
erasing the predetermined quantity of the data in response to a result of discriminating the non-emission of the ink in said driving step.

67. A method of receiving color image data representative of a color image, comprising the steps of:
receiving the color image data transmitted through a transmission path;
storing the color image data received in said receiving step;
recording a predetermined quantity of the data stored in said storing step using plural ink jet recording heads each provided with plural recording elements;
driving, after said recording step, said plural recording elements in order, so as to detect an ink emission state, thereby discriminating non-emission of the ink for each ink jet recording head; and
erasing the predetermined quantity of the data in response to a result of discriminating the non-emission of the ink in said driving step.

68. A method of recording a representation of data on a recording medium using an ink jet recording means for recording by emitting ink, the ink jet recording means being provided with plural recording elements, the method comprising the steps of:
storing image data to be recorded by the ink jet recording means;
recording on the recording medium an image according to the image data stored in said storing step, using the ink jet recording means;
recording a predetermined quantity of the image data;
driving, after said step of recording a predetermined quantity of the image data, said plural recording elements in order, so as to detect an ink emission state, thereby discriminating a non-emission of the ink; and
erasing the predetermined quantity of the image data in response to a result of discriminating the non-emission of the ink in said driving step.

69. A method according to claim 68, further comprising the step of recording a representation of received color image data representative of a color image using a color ink jet recording means using a plurality of kinds of ink,
wherein said detecting step further comprises detecting if each of the plurality of kinds of ink in the recording means has been discharged by a number of ink jets in the recording means through operation of the recording means after completion of recording by the recording means of a representation of at least some received color image data.

* * * * *

UNITED STATES PATENT AND TRADEMARK OFFICE
CERTIFICATE OF CORRECTION

PATENT NO. : 5,721,620

DATED : February 24, 1998

INVENTOR(S) : KOJI ARAI ET AL.

Page 1 of 3

It is certified that error appears in the above-identified patent and that said Letters Patent is hereby corrected as shown below:

COLUMN 1

Line 28, "image" should read --images--.

COLUMN 2

Line 24, "A yet" should read --Yet--.

COLUMN 4

Line 31, "suitable" should read --with suitable--.

COLUMN 5

Line 18, "recording image" should read --recording. Image--.

COLUMN 8

Line 52, "on is" should read --is--.

COLUMN 10

Line 25, "are not" should read --have not--.

UNITED STATES PATENT AND TRADEMARK OFFICE
CERTIFICATE OF CORRECTION

PATENT NO. : 5,721,620

DATED : February 24, 1998

INVENTOR(S): KOJI ARAI ET AL.

It is certified that error appears in the above-identified patent and that said Letters Patent is hereby corrected as shown below:

<u>COLUMN 11</u>

Line 11, "above" should read --alone--.

<u>COLUMN 13</u>

Line 52, "applicable" should read --applicable to--.

<u>COLUMN 14</u>

Line 6, "suitable a" should read --suitable as a--.
Line 43, "computor" should read --computer--.
Line 48, "psuedo" should read --pseudo--.
Line 51, "descrimination" should read --discrimination--.
Line 54, "psuedo" should read --pseudo--.
Line 59, "Reccomendation." should read --Recommendation.--.

<u>COLUMN 15</u>

Line 10, "though" should read --thought--.
Line 32, "with" should read --which--.

UNITED STATES PATENT AND TRADEMARK OFFICE
CERTIFICATE OF CORRECTION

PATENT NO. : 5,721,620

DATED : February 24, 1998

INVENTOR(S) : KOJI ARAI ET AL.

It is certified that error appears in the above-identified patent and that said Letters Patent is hereby corrected as shown below:

COLUMN 21

```
Line 53, "filmy effervescence." should read
    --film boiling.--.
Line 56, "filmy effervescence." should read
    --film boiling.--.
Line 59, "filmy effervescence." should read
    --film boiling.--.
Line 62, "filmy effervescence." should read
    --film boiling.--.
Line 65, "filmy effervescence." should read
    --film boiling.--.
```

COLUMN 22

```
Line 3, "filmy effervescence." should read
    --film boiling.--.
```

Signed and Sealed this

Tenth Day of November 1998

*Attest:*

BRUCE LEHMAN

*Attesting Officer*          Commissioner of Patents and Trademarks